(12) United States Patent
Suzuki et al.

(10) Patent No.: US 10,798,720 B2
(45) Date of Patent: Oct. 6, 2020

(54) UPLINK TRANSMISSION SKIPPING IN A TERMINAL APPARATUS

(71) Applicants: Sharp Kabushiki Kaisha, Sakai, Osaka (JP); FG Innovation Company Limited, New Territories (HK)

(72) Inventors: Shoichi Suzuki, Sakai (JP); Wataru Ouchi, Sakai (JP); Tomoki Yoshimura, Sakai (JP); Liqing Liu, Sakai (JP)

(73) Assignees: SHARP KABUSHIKI KAISHA, Sakai (JP); FG INNOVATION COMPANY LIMITED, Tuen Mun (HK)

( * ) Notice: Subject to any disclaimer, the term of this patent is extended or adjusted under 35 U.S.C. 154(b) by 0 days.

(21) Appl. No.: 16/607,414

(22) PCT Filed: Apr. 13, 2018

(86) PCT No.: PCT/JP2018/015506
§ 371 (c)(1),
(2) Date: Oct. 23, 2019

(87) PCT Pub. No.: WO2018/198822
PCT Pub. Date: Nov. 1, 2018

(65) Prior Publication Data
US 2020/0128557 A1 Apr. 23, 2020

(30) Foreign Application Priority Data

Apr. 27, 2017 (JP) ................................ 2017-088202

(51) Int. Cl.
*H04W 72/00* (2009.01)
*H04W 4/00* (2018.01)
(Continued)

(52) U.S. Cl.
CPC ......... *H04W 72/085* (2013.01); *H04L 5/0032* (2013.01); *H04W 72/042* (2013.01)

(58) Field of Classification Search
CPC .. H04W 72/085; H04W 72/042; H04L 5/0032
(Continued)

(56) References Cited

U.S. PATENT DOCUMENTS

2012/0207112 A1* 8/2012 Kim ...................... H04W 52/54
370/329
2013/0242833 A1* 9/2013 Ahn .................. H04W 72/0453
370/311
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, pp. 1-142.
(Continued)

*Primary Examiner* — Rafael Pérez-Gutiérrez
*Assistant Examiner* — Mark G. Pannell
(74) *Attorney, Agent, or Firm* — Keating & Bennett, LLP

(57) ABSTRACT

Provided is a terminal apparatus for communicating with a base station apparatus by using a primary cell (PCell) and an LAA secondary cell (LAA SCell). A first uplink transmission corresponding to a first uplink grant configured for the PCell is skipped, based on at least a state that a first parameter is configured. A second uplink transmission corresponding to a second uplink grant configured for the LAA SCell is skipped, based on at least a state that a second parameter is configured. A third uplink transmission in the PCell and a fourth uplink transmission in the LAA SCell are skipped, based on at least a state that a third parameter is configured. The third uplink transmission corresponds to a third uplink grant corresponding to a C-RNTI. The fourth uplink transmission corresponds to a fourth uplink grant corresponding to the C-RNTI.

2 Claims, 20 Drawing Sheets

(51) Int. Cl.
*H04J 3/00* (2006.01)
*H04W 72/08* (2009.01)
*H04W 72/04* (2009.01)
*H04L 5/00* (2006.01)

(58) Field of Classification Search
USPC .................................................. 455/452.1
See application file for complete search history.

(56) References Cited

U.S. PATENT DOCUMENTS

| | | | | |
|---|---|---|---|---|
| 2014/0018124 | A1* | 1/2014 | Ahn ...................... | H04W 24/10 455/522 |
| 2017/0325164 | A1* | 11/2017 | Lee ..................... | H04W 72/042 |
| 2018/0139734 | A1* | 5/2018 | Babaei .............. | H04W 72/0406 |
| 2018/0160445 | A1* | 6/2018 | Babaei ................. | H04W 72/14 |
| 2018/0176937 | A1* | 6/2018 | Chen ................... | H04W 74/085 |
| 2018/0199225 | A1* | 7/2018 | Kim ..................... | H04W 76/10 |
| 2018/0302886 | A1* | 10/2018 | Pan ..................... | H04W 72/044 |
| 2018/0317123 | A1* | 11/2018 | Chen ................. | H04W 72/0413 |
| 2019/0215906 | A1* | 7/2019 | Phuyal ................. | H04W 72/14 |

OTHER PUBLICATIONS

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, pp. 1-121.

"3rd Generation Partnership Project; Technical Specification Group Radio Access Network; Evolved Universal Terrestrial Radio Access (E-UTRA); Physical layer procedures (Release 13)", 3GPP TS 36.213 V13.0.0, Dec. 2015, pp. 1-326.

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0, Dec. 2015, pp. 1-82.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0, Dec. 2015, pp. 1-507.

Ericsson, "L2 enhancements to reduce latency", 3GPP TSG-RAN WG2 #91, Tdoc R2-153490, Aug. 24-28, 2015, pp. 1-7.

* cited by examiner

Special fields for Semi-Persistent Scheduling Activation PDCCH/EPDCCH Validation

| | DCI format 0 | DCI format 0 | DCI format 1/1A |
|---|---|---|---|
| TPC command for scheduled PUSCH | set to '00' | set to '00' | N/A |
| Cyclic shift DMRS | Set to '000' | Set to '000' | N/A |
| Modulation and coding scheme and redundancy version | MSB is set to '0' | MSB is set to '0' | N/A |
| HARQ process number | N/A | set to all '0' s | FDD: set to '000' TDD: set to '0000' |
| Modulation and coding scheme | N/A | N/A | MSB is set to '0' |
| Redundancy version | N/A | N/A | set to '00' |

FIG. 5

Special fields for Semi-Persistent Scheduling Release PDCCH/EPDCCH Validation

| | DCI format 0 | DCI format 0D | DCI format 1/1A |
|---|---|---|---|
| TPC command for scheduled PUSCH | set to '00' | set to '00' | N/A |
| Cyclic shift DMRS | Set to '000' | Set to '000' | N/A |
| Modulation and coding scheme and redundancy version | set to '11111' | set to '11111' | N/A |
| Resource block assignment and hopping resource allocation | set to all '1's | set to all '1's | N/A |
| HARQ process number | N/A | set to all '0's | FDD: set to '000' TDD: set to '0000' |
| Modulation and coding scheme | N/A | N/A | set to '11111' |
| Redundancy version | N/A | N/A | set to '00' |
| Resource block assignment | N/A | N/A | set to all '1's |

FIG. 9

Special fields for ACK PDCCH/EPDCCH Validation

| | DCI format 0 | DCI format 0D |
|---|---|---|
| TPC command for scheduled PUSCH | set to '11' | set to '11' |
| Cyclic shift DMRS | Set to '111' | Set to '111' |
| Modulation and coding scheme and redundancy version | set to '11111' | set to '11111' |
| Resource block assignment and hopping resource allocation | set to all '1's | set to all '1's |

FIG. 16

UPLINK TRANSMISSION SKIPPING IN A TERMINAL APPARATUS

TECHNICAL FIELD

The present invention relates to a terminal apparatus, a base station apparatus, and a communication method.

This application claims priority based on JP 2017-088202 filed on Apr. 27, 2017, the contents of which are incorporated herein by reference.

BACKGROUND ART

A radio access method and a radio network for cellular mobile communications (hereinafter referred to as "Long Term Evolution (LTE: Registered Trademark)", or "Evolved Universal Terrestrial Radio Access (EUTRA)") have been studied in the 3rd Generation Partnership Project (3GPP) (NPLs 1, 2, 3, 4, and 5). In 3GPP, a new radio access method (hereinafter referred to as "New Radio (NR)") has been studied. In LTE, a base station apparatus is also referred to as an evolved NodeB (eNodeB). In NR, a base station apparatus is also referred to as a gNodeB. In LTE, and in NR, a terminal apparatus is also referred to as a User Equipment (UE). LTE, as well as NR, is a cellular communication system in which multiple areas are deployed in a cellular structure, with each of the multiple areas being covered by a base station apparatus. A single base station apparatus may manage multiple cells.

LTE supports a Time Division Duplex (TDD). LTE that employs the TDD scheme is also referred to as TD-LTE or LTE TDD. In TDD, uplink signals and downlink signals are time division multiplexed. LTE supports a Frequency Division Duplex (FDD).

In 3GPP, latency reduction enhancements have been studied. For example, for the latency reduction enhancements, Scheduling request first grant or Pre-scheduled first grant has been studied (NPL 6).

CITATION LIST

Non Patent Literature

NPL 1: "3GPP TS 36.211 V13.0.0 (2015-12)", 6th January, 2016.
NPL 2: "3GPP TS 36.212 V13.0.0 (2015-12)", 6th January, 2016.
NPL 3: "3GPP TS 36.213 V13.0.0 (2015-12)", 6th January, 2016.
NPL 4: "3GPP TS 36.321 V13.0.0 (2015-12)", 14th January, 2016.
NPL 5: "3GPP TS 36.331 V13.0.0 (2015-12)", 7th January, 2016.
NPL 6: "L2 enhancements to reduce latency", R2-153490, Ericsson, 3GPP TSG-RAN WG2#91, Beijing, China, 24-28 Aug. 2015.

SUMMARY OF INVENTION

Technical Problem

However, for the radio communication system as described above, a concrete procedure for transmitting uplink data has not been sufficiently studied.

One aspect of the present invention has been made in light of the foregoing, and an object of the present invention is to provide a terminal apparatus, a base station apparatus, a communication method, and an integrated circuit, which enable efficient transmission of uplink data.

Solution to Problem (1) To accomplish the object described above, aspects of the present invention are contrived to provide the following measures. Specifically, a terminal apparatus according to one aspect of the present invention is a terminal apparatus including: a receiver configured to receive, from a base station apparatus, information UECapabilityEnquiry used to request transmission of capability information UECapabilityInformation of the terminal apparatus; and a transmitter configured to transmit the capability information UECapabilityInformation to the base station apparatus, wherein the capability information UECapabilityInformation includes at least a capability parameter SPS, a capability parameter skipUplinkSPS, and a capability parameter skipUplinkLaaSPS, the capability parameter SPS indicates whether the terminal apparatus supports Semi-Persistent Scheduling in a primary cell, the capability parameter skipUplinkSPS indicates whether the terminal apparatus supports skipping of uplink transmission corresponding to a grant configured for the primary cell in a case that there is no available data for transmission in a buffer of the terminal apparatus, and the capability parameter skipUplinkLaaSPS indicates (i) whether the terminal apparatus supports the Semi-Persistent Scheduling in an LAA secondary cell, and (ii) whether the terminal apparatus supports skipping of uplink transmission corresponding to the grant configured for the LAA secondary cell in a case that there is no available data for transmission in the buffer of the terminal apparatus.

(2) A terminal apparatus according to one aspect of the present invention is a terminal apparatus for communicating with a base station apparatus by using a primary cell and an LAA secondary cell, the terminal apparatus including: a receiver configured to receive information for indicating a parameter skipUplinkTxSPS corresponding to the primary cell, information for indicating a parameter skipUplinkTxLaaSPS corresponding to the LAA secondary cell, and information for indicating a parameter skipUplinkTxDynamic corresponding to the primary cell and the LAA secondary cell; and a transmitter configured to perform uplink transmission, wherein the transmitter further skips first uplink transmission corresponding to a first uplink grant configured for the primary cell, based on at least a state that the parameter skipUplinkTxSPS is configured; skips second uplink transmission corresponding to a second uplink grant configured for the LAA secondary cell, based on at least a state that the parameter skipUplinkTxLaaSPS is configured; and skips third uplink transmission in the primary cell and fourth uplink transmission in the LAA secondary cell, based on at least a state that the parameter skipUplinkTxDynamic is configured, the third uplink transmission corresponding to a third uplink grant corresponding to a C-RNTI, and the fourth uplink transmission corresponding to a fourth uplink grant corresponding to the C-RNTI.

(3) A base station apparatus according to one aspect of the present invention is a base station apparatus including: a transmitter configured to transmit, to a terminal apparatus, information UECapabilityEnquiry used to request transmission of capability information UECapabilityInformation of the terminal apparatus; and a receiver configured to receive the capability information UECapabilityInformation from the terminal apparatus, wherein the capability information UECapabilityInformation includes at least a capability parameter SPS, a capability parameter skipUplinkSPS, and a capability parameter skipUplinkLaaSPS, the capability parameter SPS indicates whether the terminal apparatus supports Semi-Persistent Scheduling in a primary cell, the capability parameter skipUplinkSPS indicates whether the terminal apparatus supports skipping of uplink transmission corresponding to a grant configured for the primary cell in a case that there is no available data for transmission in a buffer of the terminal apparatus, and the capability parameter skipUplinkLaaSPS indicates (i) whether the terminal apparatus supports the Semi-Persistent Scheduling in an LAA secondary cell, and (ii) whether the terminal apparatus supports skipping of uplink transmission corresponding to the grant configured for the LAA secondary cell in a case that there is no available data for transmission in the buffer of the terminal apparatus.

(4) A communication method of a terminal apparatus according to one aspect of the present invention includes: receiving, from a base station apparatus, information UECapabilityEnquiry used to request transmission of capability information UECapabilityInformation of the terminal apparatus; and transmitting the capability information UECapabilityInformation to the base station apparatus, wherein the capability information UECapabilityInformation includes at least a capability parameter SPS, a capability parameter skipUplinkSPS, and a capability parameter skipUplinkLaaSPS, the capability parameter SPS indicates whether the terminal apparatus supports Semi-Persistent Scheduling in a primary cell, the capability parameter skipUplinkSPS indicates whether the terminal apparatus supports skipping of uplink transmission corresponding to a grant configured for the primary cell in a case that there is no available data for transmission in a buffer of the terminal apparatus, and the capability parameter skipUplinkLaaSPS indicates (i) whether the terminal apparatus supports the Semi-Persistent Scheduling in an LAA secondary cell, and (ii) whether the terminal apparatus supports skipping of uplink transmission corresponding to the grant configured for the LAA secondary cell in a case that there is no available data for transmission in the buffer of the terminal apparatus.

(5) A communication method of a terminal apparatus according to one aspect of the present invention is a communication method used in a terminal apparatus for communicating with a base station apparatus by using a primary cell and an LAA secondary cell, the communication method including: receiving information for indicating a parameter skipUplinkTxSPS corresponding to the primary cell, information for indicating a parameter skipUplinkTxLaaSPS corresponding to the LAA secondary cell, and information for indicating a parameter skipUplinkTxDynamic corresponding to the primary cell and the LAA secondary cell; skipping first uplink transmission corresponding to a first uplink grant configured for the primary cell, based on at least a state that the parameter skipUplinkTxSPS is configured; skipping second uplink transmission corresponding to a second uplink grant configured for the LAA secondary cell, based on at least a state that the parameter skipUplinkTxLaaSPS is configured; and skipping third uplink transmission in the primary cell and fourth uplink transmission in the LAA secondary cell, based on at least a state that the parameter skipUplinkTxDynamic is configured, the third uplink transmission corresponding to a third uplink grant corresponding to a C-RNTI, and the fourth uplink transmission corresponding to a fourth uplink grant corresponding to the C-RNTI.

(6) A communication method of a base station apparatus according to one aspect of the present invention includes: transmitting, to a terminal apparatus, information UECapabilityEnquiry used to request transmission of capability information UECapabilityInformation of the terminal apparatus; and receiving the capability information UECapabilityInformation from the terminal apparatus, wherein the capability information UECapabilityInformation includes at least a capability parameter SPS, a capability parameter skipUplinkSPS, and a capability parameter skipUplinkLaaSPS, the capability parameter SPS indicates whether the terminal apparatus supports Semi-Persistent Scheduling in a primary cell, the capability parameter skipUplinkSPS indicates whether the terminal apparatus supports skipping of uplink transmission corresponding to a grant configured for the primary cell in a case that there is no available data for transmission in a buffer of the terminal apparatus, and the capability parameter skipUplinkLaaSPS indicates (i) whether the terminal apparatus supports the Semi-Persistent Scheduling in an LAA secondary cell, and (ii) whether the terminal apparatus supports skipping of uplink transmission corresponding to the grant configured for the LAA secondary cell in a case that there is no available data for transmission in the buffer of the terminal apparatus.

Advantageous Effects of Invention

According to one aspect of the present invention, uplink data can be transmitted efficiently.

BRIEF DESCRIPTION OF DRAWINGS

FIG. 5 is a diagram illustrating an example of Special fields for release of Semi-Persistent Scheduling according to the present embodiment.

FIG. 9 is a diagram for illustrating an example of Non-empty transmission and Empty transmission according to the present embodiment.

FIG. 16 is a diagram illustrating an example of special fields for deactivation of non-adaptive transmission of a transport block initially transmitted on a semi-persistent PUSCH according to the present embodiment.

DESCRIPTION OF EMBODIMENTS

Embodiments of the present invention will be described below.

Figure 1:
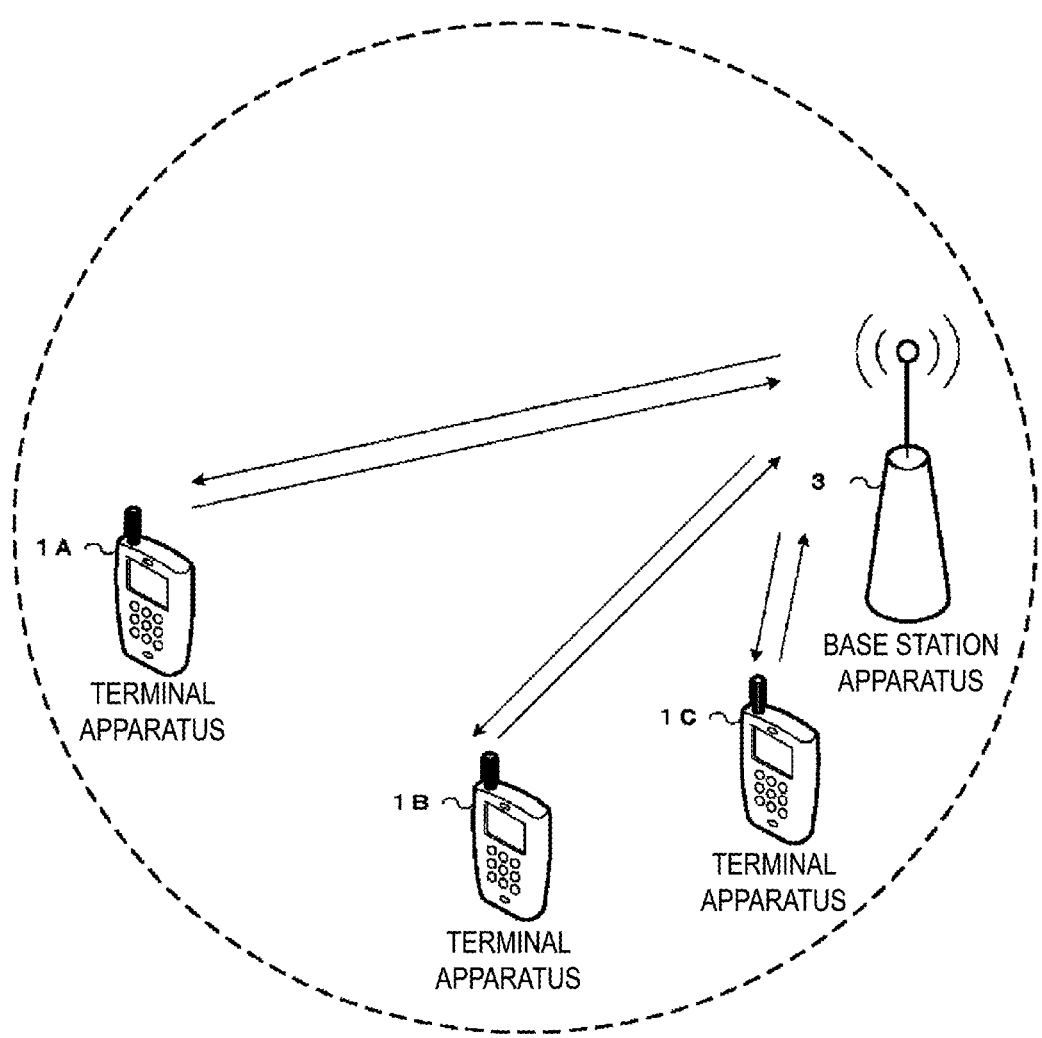
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Each of the terminal apparatuses 1A to 1C is hereinafter also referred to as a terminal apparatus 1.

Physical channels and physical signals according to the present embodiment will be described.

In FIG. 1, in uplink radio communication from the terminal apparatus 1 to the base station apparatus 3, the following uplink physical channels are used. Here, the uplink physical channels are used to transmit information output from the higher layers.

Physical Uplink Control Channel (PUCCH)
Physical Uplink Shared Channel (PUSCH)
Physical Random Access Channel (PRACH)

The PUCCH is used to transmit Uplink Control Information (UCI). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ-ACK for downlink data (Transport block, Medium Access Control Protocol Data Unit (MAC PDU), Downlink-Shared Channel (DL-SCH), or Physical Downlink Shared Channel (PDSCH)).

To be more specific, the HARQ-ACK may indicate an acknowledgement (ACK) or a negative-acknowledgement (NACK). Here, the HARQ-ACK may also be referred to as an ACK/NACK, a HARQ feedback, a HARQ acknowledgement, HARQ information, or HARQ control information.

The PUSCH is used to transmit uplink data (Uplink-Shared Channel (UL-SCH)). The PUSCH may be used to transmit a HARQ-ACK and/or CSI along with the uplink data. The PUSCH may be used to transmit CSI only or a HARQ-ACK and CSI only. To be more specific, the PUSCH may be used to transmit the uplink control information only.

Here, the base station apparatus 3 and the terminal apparatus 1 exchange (transmit and/or receive) signals with each other in their respective higher layers. For example, the base station apparatus 3 and the terminal apparatus 1 may transmit and/or receive Radio Resource Control (RRC) signaling (also referred to as a Radio Resource Control (RRC) message or Radio Resource Control (RRC) information) in a Radio Resource Control (RRC) layer. The base station apparatus 3 and the terminal apparatus 1 may transmit and/or receive a Medium Access Control (MAC) control element in a Medium Access Control (MAC) layer. Here, the RRC signaling and/or the MAC control element is also referred to as higher layer signaling.

The PUSCH may be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). To be more specific, user equipment-specific information (information unique to user equipment) may be transmitted through signaling dedicated to a certain terminal apparatus 1.

The PRACH is used to transmit a random access preamble. The PRACH may be used for an initial connection establishment procedure, a handover procedure, a connection re-establishment procedure, uplink transmission synchronization (timing adjustment), and indication of a PUSCH resource request.

In FIG. 1, the following uplink physical signal is used in the uplink radio communication. Here, the uplink physical signal is not used to transmit information output from the higher layers but is used by the physical layer.

Uplink Reference Signal (UL RS)

According to the present embodiment, the following two types of uplink reference signals are used.

Demodulation Reference Signal (DMRS)
Sounding Reference Signal (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station apparatus 3 uses the SRS in order to measure an uplink channel state.

In FIG. 1, the following downlink physical channels are used for downlink radio communication from the base station apparatus 3 to the terminal apparatus 1. Here, the downlink physical channels are used to transmit information output from the higher layers.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)

Enhanced Physical Downlink Control Channel (EPD-CCH)

Physical Downlink Shared Channel (PDSCH)

Physical Multicast Channel (PMCH)

The PBCH is used to broadcast a Master Information Block (MIB, a Broadcast Channel (BCH)) that is shared by the terminal apparatuses 1.

The PCFICH is used to transmit information indicating a region (OFDM symbols) to be used for transmission of the PDCCH.

The PHICH is used to transmit a HARQ indicator (HARQ feedback or response information) indicating an ACKnowledgement (ACK) or a Negative ACKnowledgement (NACK) for the uplink data (Uplink Shared Channel (UL-SCH)) received by the base station apparatus 3.

The PDCCH and the EPDCCH are used to transmit Downlink Control Information (DCI). Here, multiple DCI formats are defined for transmission of the downlink control information. To be more specific, a field for the downlink control information is defined in a DCI format and is mapped to information bits.

For example, as downlink DCI formats, DCI formats (e.g., DCI format 1, DCI format 1A and/or DCI format 1C) to be used for the scheduling of one PDSCH in one cell (transmission of one downlink transport block) may be defined.

Here, each of the downlink DCI formats includes information of the scheduling of the PDSCH. For example, the downlink DCI format includes downlink control information such as a Carrier Indicator Field (CIF), information of a HARQ process number, information of a Modulation and Coding Scheme (MCS), information of a Redundancy version, and/or information of Resource block assignment. Here, the downlink DCI format is also referred to as a downlink grant and/or downlink assignment. The HARQ process number is also referred to as a HARQ process identifier (ID).

For example, as uplink DCI formats, DCI formats (e.g., DCI format 0, DCI format 0D, and DCI format 4) to be used for the scheduling of one PUSCH in one cell (transmission of one uplink transport block) are defined.

Here, each of the uplink DCI formats includes information of the scheduling of the PUSCH. For example, the uplink DCI format includes downlink control information such as a Carrier Indicator Field (CIF), information of a transmit power command (TPC command) for a scheduled PUSCH, information of Cyclic shift DMRS, information of a Modulation and coding scheme (MCS) and/or redundancy version, and/or information of Resource block assignment and/or hopping resource allocation. Here, the uplink DCI format is also referred to as an uplink grant and/or Uplink assignment.

In a case that a PDSCH resource is scheduled in accordance with the downlink assignment, the terminal apparatus 1 may receive downlink data on the scheduled PDSCH. In a case that a PUSCH resource is scheduled in accordance with the uplink grant, the terminal apparatus 1 may transmit uplink data and/or uplink control information on the scheduled PUSCH.

Here, the terminal apparatus 1 may monitor a set of PDCCH candidates and/or EPDCCH candidates. The PDCCH may hereinafter indicate a PDCCH and/or an EPDDCH. Here, the PDCCH candidates are candidates which the PDCCH may be mapped to and/or transmitted on by the base station apparatus 3. To "monitor" may include meaning that the terminal apparatus 1 attempts to decode each PDCCH in the set of PDCCH candidates, in accordance with each of all the monitored DCI formats.

The set of PDCCH candidates to be monitored by the terminal apparatus 1 is also referred to as a search space. The search space may include a Common Search Space (CSS). For example, the CSS may be defined as a space common to multiple terminal apparatuses 1. The search space may include a UE-specific Search Space (USS). For example, the USS may be defined at least based on a C-RNTI assigned to the terminal apparatus 1. The terminal apparatus 1 may monitor the PDCCHs in the CSS and/or USS to detect a PDCCH destined for the terminal apparatus 1 itself.

Here, an RNTI assigned to the terminal apparatus 1 by the base station apparatus 3 is used for the transmission of the downlink control information (transmission on the PDCCH). Specifically, Cyclic Redundancy check (CRC) parity bits are added to the DCI format (that may be downlink control information), and after the adding, the CRC parity bits are scrambled with the RNTI. Here, the CRC parity bits added to the DCI format may be obtained from a payload of the DCI format.

The terminal apparatus 1 attempts to decode the DCI format to which the CRC parity bits scrambled with the RNTI are added, and detects, as a DCI format destined for the terminal apparatus 1 itself, the DCI format for which the CRC has been successful (also referred to as blind coding). To be more specific, the terminal apparatus 1 may detect the PDCCH with the CRC scrambled with the RNTI. The terminal apparatus 1 may detect the PDCCH including the DCI format to which the CRC parity bits scrambled with the RNTI are added.

A DCI format/PDCCH/uplink grant/downlink assignment to which CRC parity bits scrambled with the RNTI are added is also referred to as (1) a DCI format/PDCCH/uplink grant/downlink assignment corresponding to the RNTI, (2) a DCI format/PDCCH/uplink grant/downlink assignment addressed to the RNTI, and (3) a DCI format/PDCCH/uplink grant/downlink assignment for the RNTI.

Here, the RNTI may include a Cell-Radio Network Temporary Identifier (C-RNTI). The C-RNTI is an identifier unique to the terminal apparatus 1 and used for the identification in RRC connection and scheduling. The C-RNTI may be used for dynamically scheduled unicast transmission.

The RNTI may further include a Semi-Persistent Scheduling C-RNTI (SPS C-RNTI). The SPS C-RNTI is an identifier unique to the terminal apparatus 1 and used for Semi-Persistent Scheduling. The SPS C-RNTI may be used for semi-persistently scheduled unicast transmission.

Here, the semi-persistently scheduled transmission includes meaning of periodically scheduled transmission. For example, the SPS C-RNTI may be used for activation, reactivation, and/or retransmission of the semi-persistently scheduled transmission. Hereinafter, the activation may include meaning of the reactivation and/or the retransmission.

The SPS C-RNTI may be used for release and/or deactivation of the semi-persistently scheduled transmission. Hereinafter, the release may include meaning of the deactivation. Here, an RNTI may be newly defined for the latency reduction. For example, the SPS C-RNTI in the present embodiment may include an RNTI newly defined for the latency reduction.

The RNTI may include a Random Access RNTI (RA-RNTI). The RA-RNTI is an identifier used for transmission of a random access response message. To be more specific, the RA-RNTI is used for the transmission of the random access response message in a random access procedure. For example, the terminal apparatus 1 may monitor the PDCCH with the CRC scrambled with the RA-RNTI after the transmission of a random access preamble. The terminal apparatus 1 may receive a random access response on the PDSCH, based on detection of the PDCCH with the CRC scrambled with the RA-RNTI.

The RNTI may further include a Paging RNTI (P-RNTI). The P-RNTI is an identifier used for paging and notification of system information modification. For example, the P-RNTI is used for paging and transmission of a system information message. For example, the terminal apparatus 1 may receive paging on the PDSCH, based on detection of the PDCCH with the CRC scrambled with the P-RNTI.

The RNTI may further include a System Information RNTI (SI-RNTI). The SI-RNTI is an identifier used for broadcast of the system information. For example, the SI-RNTI is used for transmission of the system information message. For example, the terminal apparatus 1 may receive the system information message on the PDSCH, based on detection of the PDCCH with the CRC scrambled with the SI-RNTI.

Here, for example, the PDCCH with the CRC scrambled with the C-RNTI may be transmitted in the USS or CSS. The PDCCH with the CRC scrambled with the RA-RNTI may be transmitted only in the CSS. The PDCCH with the CRC scrambled with the P-RNTI may be transmitted only in the CSS. The PDCCH with the CRC scrambled with the SI-RNTI may be transmitted only in the CSS.

The PDCCH with the CRC scrambled with the SPS C-RNTI may be transmitted only in a primary cell and primary secondary cell. The PDCCH with the CRC scrambled with the SPS C-RNTI may be transmitted in the USS or CSS.

The PDSCH is used to transmit downlink data (Downlink Shared Channel (DL-SCH)). The PDSCH is used to transmit a system information message. Here, the system information message may be cell-specific information (information unique to a cell). The system information is included in RRC signaling. The PDSCH is used to transmit the RRC signaling and the MAC control element.

The PMCH is used to transmit multicast data (Multicast Channel (MCH)).

In FIG. 1, the following downlink physical signals are used for downlink radio communication. Here, the downlink physical signals are not used to transmit information output from the higher layers but are used by the physical layer.

Synchronization signal (SS)
Downlink Reference Signal (DL RS)

The synchronization signal is used for the terminal apparatus 1 to establish synchronization in a frequency domain and a time domain in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal apparatus 1 to perform channel compensation on a downlink physical channel. Here, the downlink reference signal is used for the terminal apparatus 1 to calculate downlink channel state information.

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Chanel State Information-Reference Signal (NZP CSI-RS)
Zero Power Chanel State Information-Reference Signal (ZP CSI-RS)
Multimedia Broadcast and Multicast Service over Single Frequency Network Reference signal (MBSFN RS)
Positioning Reference Signal (PRS)

Here, the downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). Control of a Hybrid Automatic Repeat reQuest (HARQ) is performed for each transport block in the MAC layer. The transport block is a unit of data that the MAC layer delivers to the physical layer. In the physical layer, the transport block is mapped to a codeword, and coding processing is performed for each codeword.

Carrier aggregation will be described below.

In the present embodiment, one or multiple serving cells may be configured for the terminal apparatus 1. A technology in which the terminal apparatus 1 communicates via multiple serving cells is referred to as cell aggregation or carrier aggregation.

Here, the present embodiment may apply to one or each of the multiple serving cells configured for the terminal apparatus 1. Alternatively, the present embodiment may apply to one or some of the multiple serving cells configured for the terminal apparatus 1. Alternatively, the present embodiment may apply to one or each of the multiple serving cell groups configured for the terminal apparatus 1.

In the present embodiment, Time Division Duplex (TDD) and/or Frequency Division Duplex (FDD) may apply. Here, for the carrier aggregation, TDD or FDD may apply to one or all of the multiple serving cells. Alternatively, for the carrier aggregation, serving cells to which TDD applies and serving cells to which FDD applies may be aggregated. Here, a frame structure for FDD is also referred to as Frame structure type 1. A frame structure for TDD is also referred to as Frame structure type 2.

One or more serving cells configured may include one primary cell, zero or one primary secondary cell, zero or more secondary cells, and zero or more Licensed Assisted Access (LAA) secondary cells. For example, the primary cell may be a serving cell in which an initial connection establishment procedure has been performed, a serving cell in which a connection re-establishment procedure has been initiated, or a cell indicated as the primary cell by a handover procedure. Here, at the time point or after an RRC connection is established, secondary cell(s) and/or primary secondary cell(s) may be configured.

The primary cell may be included in a licensed band or an unlicensed band. For example, in LTE, the primary cell may be included in a licensed band. For example, in NR, the primary cell may be included in a licensed band or an unlicensed band. The primary secondary cell may be included in a licensed band or an unlicensed band. The secondary cell may be included in a licensed band. The LAA secondary cell may be included in an unlicensed band. A serving cell belonging to a licensed band is also referred to as a licensed cell. A serving cell belonging to an unlicensed band is also referred to as an unlicensed cell.

A frequency used by the unlicensed cell may be commonly used by other communication systems and/or other LTE operators. In this case, a fair frequency sharing technique may be used in a communication scheme used in the unlicensed cell.

The fair frequency sharing technique may include Listen-Before-Talk (LBT). Before a radio transmission and/or reception apparatus (the base station apparatus 3 or the terminal apparatus 1) transmits a physical channel and a physical signal by using the unlicensed cell (a component carrier, a channel, a medium, or a frequency), interference power (an interference signal, received power, a reception signal, noise power, or a noise signal) or the like in the unlicensed cell is measured (detected). Based on the measurement (detection), which of an idle state and a busy state the unlicensed cell is in is identified (detected, assumed, or determined). In a case that the radio transmission and/or reception apparatus identifies, based on the measurement (detection), that the unlicensed cell is in an idle state, the radio transmission and/or reception apparatus can transmit a physical channel and a physical signal in the unlicensed cell. In a case that the radio transmission and/or reception apparatus identifies, based on the measurement (detection), that the unlicensed cell is in a busy state, the radio transmission and/or reception apparatus does not transmit a physical channel and a physical signal in the unlicensed cell.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 may simultaneously perform transmission and/or reception on multiple physical channels in one or multiple serving cells (component carriers). Here, transmission of one physical channel may be performed in one serving cell (component carrier) of the multiple serving cells (component carriers).

In a case that dual connectivity (DC) is configured for the terminal apparatus 1, a Master Cell Group (MCG) is a subset of all the serving cells, and a Secondary Cell Group (SCG) is a subset of serving cells that are not a part of the MCG. In a case that DC is not configured for the terminal apparatus 1, the MCG includes all the serving cells. In a case that DC is not configured for the terminal apparatus 1, the SCG may not be defined. The MCG includes a primary cell, zero or more secondary cells, and zero or more LAA secondary cells. The SCG includes a primary secondary cell, zero or more secondary cells, and zero or more LAA secondary cells.

The same Radio Access Technology (RAT) may apply to the MCG and the SCG. Different RATs may apply to the MCG and the SCG. Here, the RAT(s) includes EUTRA and NR. For example, EUTRA may apply to the MCG, and NR may apply to the SCG. For example, EUTRA may apply to both the MCG and the SCG. For example, NR may apply to both the MCG and the SCG.

Here, the transmission on the PUCCH may be performed only in a primary cell and a primary secondary cell. The primary cell cannot be deactivated. The primary secondary cell may not be deactivated. The primary secondary cell may be deactivated. Cross-carrier scheduling does not apply to the primary cell and the primary secondary cell (Cross-carrier scheduling does not apply to primary cell). To be more specific, the primary cell is always scheduled via the PDCCH in the primary cell. To be more specific, the primary secondary cell is always scheduled via the PDCCH in the primary secondary cell.

The secondary cell is activated and/or deactivated. In a case that a PDCCH (that may be PDCCH monitoring) of a certain secondary cell is configured, cross-carries scheduling may not apply this certain secondary cell. To be more specific, in this case, the secondary cell may always be scheduled via the PDCCH in the secondary cell. In a case that no PDCCHs (that may be PDCCH monitoring) of a certain secondary cell are configured, cross-carrier scheduling may apply, and the secondary cell may always be scheduled via a PDCCH of one other serving cell.

The serving cell is associated with a serving cell index ServCellIndex. The serving cell index ServCellIndex of the primary cell is 0. The serving cell index ServCellIndex of the primary secondary cell is 0. The serving cell index ServCellIndex of the secondary cell is the same as a secondary cell index SCellIndex. The base station apparatus 3 may transmit higher layer signaling (RRC message) for indicating the secondary cell index SCellIndex corresponding to the secondary cell to the terminal apparatus 1.

In each of the MCG and the SCG, the serving cell index ServCellIndex is defined individually.

In the following, unless otherwise specifically noted, the processing in the present embodiment may apply to the MCG. In the following, unless otherwise specifically noted, in a case that the present embodiment applies to the SCG, the primary cell may mean the primary secondary cell.

A configuration of a slot according to the present embodiment will be described below.

Figure 2:
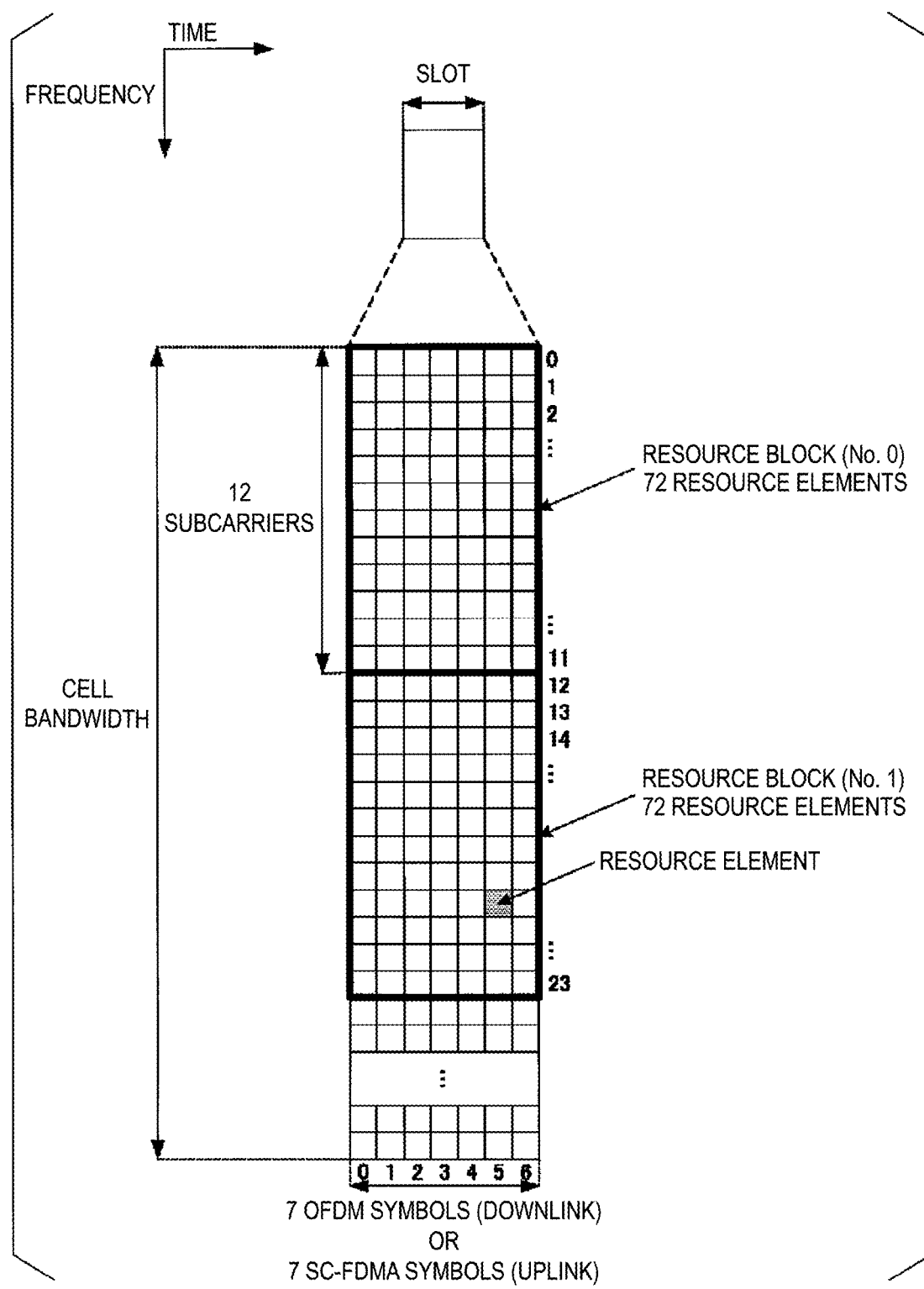
FIG. 2 is a diagram illustrating a configuration of a slot according to the present embodiment.

FIG. 2 is a diagram illustrating a configuration of a slot according to the present embodiment. In FIG. 2, a horizontal axis represents a time axis, and a vertical axis represents a frequency axis. Here, a normal Cyclic Prefix (CP) may apply to an OFDM symbol. Alternatively, an extended Cyclic Prefix (CP) may apply to an OFDM symbol. The physical signal or physical channel transmitted in each of the slots is expressed by a resource grid.

Here, in the downlink, the resource grid may be defined with multiple subcarriers and multiple OFDM symbols. In the uplink, the resource grid may be defined with multiple subcarriers and multiple SC-FDMA symbols. The number of subcarriers constituting one slot may depend on a cell bandwidth. The number of OFDM symbols or SC-FDMA symbols constituting one slot may be seven. Here, each element within the resource grid is referred to as a resource element. The resource element may be identified by a subcarrier number and an OFDM symbol or SC-FDMA symbol number.

Here, a resource block may be used to express mapping of a certain physical channel (PDSCH, PUSCH, or the like) to resource elements. For the resource block, a virtual resource block and a physical resource block may be defined. A certain physical channel may be first mapped to the virtual resource block. Thereafter, the virtual resource block may be mapped to the physical resource block. One physical resource block may be defined with seven consecutive OFDM symbols or SC-FDMA symbols in the time domain and 12 consecutive subcarriers in the frequency domain. Thus, one physical resource block may include (7×12) resource elements. One physical resource block may correspond to one slot in the time domain and correspond to 180 kHz in the frequency domain. The physical resource blocks may be numbered from zero in the frequency domain.

In the time domain, a radio frame includes 20 slots. In the time domain, a subframe includes two slots. To be more specific, in the time domain, the radio frame includes 10 subframes. The subframe may include one slot. To be more specific, the subframe may be a slot in the present embodiment.

In the present embodiment, for the description of the processing in the terminal apparatus 1, described are processing of a MAC entity in the terminal apparatus 1, a "Multiplexing and assembly" entity in the terminal apparatus 1, and/or a HARQ entity in the terminal apparatus 1. The "Multiplexing and assembly" entity is hereinafter also referred to as a first entity or a first process. The MAC entity includes one first entity and one or more HARQ entities. To be more specific, the present embodiment describes the processing of the MAC entity in the terminal apparatus 1, the first entity in the terminal apparatus 1, and/or the HARQ entity in the terminal apparatus 1. However, as a matter of course, the processing in the present embodiment is the processing in the terminal apparatus 1.

The terminal apparatus 1 may include the MAC entity for the MCG, the HARQ entity for the MCG, the first entity for the MCG, the MAC entity for the SCG, the HARQ entity for the SCG, and the first entity for the SCG.

In the following, unless otherwise specifically noted, the present embodiment describes processing in one MAC entity in the terminal apparatus 1. In the present embodiment, each of one or more HARQ entities corresponds to one serving cell. For example, one MAC entity of the terminal apparatus 1 may include the HARQ entity corresponding to the primary cell, the HARQ entity corresponding to the secondary cell, and the HARQ entity corresponding to the LAA secondary cell.

The HARQ entity manages multiple HARQ processes. The HARQ entity indicates to a HARQ process to trigger initial transmission or retransmission. Here, the initial transmission is also referred to as HARQ initial transmission or PUSCH initial transmission. Here, the retransmission is also referred to as HARQ retransmission or PUSCH retransmission.

The terminal apparatus 1 and the base station apparatus 3 provide HARQ functionality. In the uplink, synchronous HARQ or asynchronous HARQ is applied. To be more specific, uplink HARQ operation includes a synchronous operation and an asynchronous operation.

The base station apparatus 3 may transmit a higher layer parameter to the terminal apparatus 1 by including the higher layer parameter in higher layer signaling (RRC message). The base station apparatus 3 may transmit higher layer signaling (RRC message) for indicating configuration or release of a higher layer parameter to the terminal apparatus 1.

The base station apparatus 3 may transmit a HARQ parameter to the terminal apparatus 1 by including the HARQ parameter in higher layer signaling (RRC message). The base station apparatus 3 may transmit information for indicating configuration or release of a HARQ parameter to the terminal apparatus 1 by including the information in higher layer signaling (RRC message). Which of the synchronous HARQ and the asynchronous HARQ is to apply to the HARQ process may be determined based on at least the HARQ parameter. The HARQ parameter may be configured for each serving cell. The HARQ parameter may be configured for each serving cell group. The HARQ parameter may be configured for the terminal apparatus 1. To be more specific, the HARQ parameter may correspond to multiple serving cells.

Unless otherwise specifically noted, the embodiment described below describes processing for one serving cell, one HARQ entity, and one HARQ process.

The HARQ parameter may be used to determine an uplink HARQ timing, $k_{PUSCH}$ may be provided based on at least the HARQ parameter. $k_{PUSCH}$ may be provided based on at least whether the HARQ parameter is configured. Here, the terminal apparatus 1 adjusts transmission of the PUSCH in subframe n, based on detection of the PDCCH (uplink grant) in subframe $n-k_{PUSCH}$. To be more specific, a subframe in which the PUSCH is transmitted may be provided based on at least the HARQ parameter. To be more specific, a subframe in which the PUSCH is transmitted may be provided based on at least whether the HARQ parameter is configured.

Unless otherwise specifically noted, the uplink grant described below may be substituted by (1) an uplink grant for scheduling PUSCH initial transmission, or (2) an uplink grant for scheduling PUSCH transmission (initial transmission or retransmission). The uplink grant for PUSCH initial transmission and the uplink grant for PUSCH retransmission may be detected by different types of search spaces.

In the present embodiment, the terminal apparatus 1 and the base station apparatus 3 support both or one of the synchronous HARQ and the asynchronous HARQ. The terminal apparatus 1 may determine which of the synchronous HARQ and the asynchronous HARQ is to apply to the HARQ process, based on at least a part or all of the following elements.

Element 1: Whether a HARQ parameter relating to a HARQ is configured

Element 2: Search space (common search space, user equipment-specific search space) in which a PDCCH including an uplink grant is detected Element 3: RNTI (C-RNTI, SPS C-RNTI) used for transmission of a PDCCH including an uplink grant Element 4: Whether an uplink grant is a configured grant For example, in a case that a HARQ parameter is not configured for the terminal apparatus 1, the synchronous HARQ may apply to a corresponding HARQ process.

For example, in a case that a HARQ parameter is configured for the terminal apparatus 1, the asynchronous HARQ may apply to a corresponding HARQ process.

In a case that a HARQ parameter is configured for the terminal apparatus 1, which of the synchronous HARQ and the asynchronous HARQ is to apply to a corresponding HARQ process may be determined based on a type of a search space in which a PDCCH including an uplink grant is detected.

For example, in a case that a HARQ parameter is configured for the terminal apparatus 1 and a PDCCH including an uplink grant is detected in a common search space, the synchronous HARQ may apply to a corresponding HARQ process.

For example, in a case that a HARQ parameter is configured for the terminal apparatus 1 and a PDCCH including an uplink grant is detected in a user equipment-specific search space, the asynchronous HARQ may apply to a corresponding HARQ process.

The synchronous HARQ may apply to a transport block transmitted on a PUSCH scheduled by using DCI format 0. The asynchronous HARQ may apply to a transport block transmitted on a PUSCH scheduled by using DCI format 0D. DCI format 0 does not include information of the HARQ process number. DCI format OD includes information of the HARQ process number.

In a case that a HARQ parameter is not configured for the terminal apparatus 1, the terminal apparatus 1 may monitor DCI format 0 in a common search space and a user equipment-specific search space.

In a case that a HARQ parameter is configured for the terminal apparatus 1, the terminal apparatus 1 may monitor DCI format 0 in a common search space, and may monitor DCI format OD in a user equipment-specific search space.

In a case that a HARQ parameter is configured for the terminal apparatus 1, which of the synchronous HARQ and the asynchronous HARQ is to apply to a corresponding HARQ process may be determined based on at least a type of an RNTI (e.g., C-RNTI, SPS C-RNTI) used for transmission of a PDCCH including an uplink grant.

For example, in a case that a HARQ parameter is configured for the terminal apparatus 1 and an SPS C-RNTI is used for transmission of a PDCCH including an uplink grant, the synchronous HARQ may apply to a corresponding HARQ process.

For example, in a case that a HARQ parameter is configured for the terminal apparatus 1, an SPS C-RNTI is used for transmission of a PDCCH including an uplink grant, and the PDCCH is detected in a common search space, the synchronous HARQ may apply to a corresponding HARQ process.

For example, in a case that a HARQ parameter is configured for the terminal apparatus 1, an SPS C-RNTI is used for transmission of a PDCCH including an uplink grant, and the PDCCH is detected in a user equipment-specific search space, the asynchronous HARQ may apply to a corresponding HARQ process.

For example, in a case that a HARQ parameter is configured for the terminal apparatus 1, and a C-RNTI is used for transmission of a PDCCH including an uplink grant, the asynchronous HARQ may apply to a corresponding HARQ process.

For example, in a case that a HARQ parameter is configured for the terminal apparatus 1, a C-RNTI is used for transmission of a PDCCH including an uplink grant, and the PDCCH is detected in a common search space, the synchronous HARQ may apply to a corresponding HARQ process.

For example, in a case that a HARQ parameter is configured for the terminal apparatus 1, a C-RNTI is used for transmission of a PDCCH including an uplink grant, and the PDCCH is detected in a user equipment-specific search space, the asynchronous HARQ may apply to a corresponding HARQ process.

In a case that a HARQ parameter is configured for the terminal apparatus 1, which of the synchronous HARQ and the asynchronous HARQ is to apply to a corresponding HARQ process may be determined based on at least whether Semi-Persistent Scheduling is used.

In a case that a HARQ parameter is configured for the terminal apparatus 1, which of the synchronous HARQ and the asynchronous HARQ is to apply to a corresponding HARQ process may be determined based on at least whether an uplink grant is a configured grant.

In a case that a HARQ parameter is configured for the terminal apparatus 1, which of the synchronous HARQ and the asynchronous HARQ is to apply to a corresponding HARQ process may be determined based on at least whether a parameter skipUplinkTxSPS is configured.

In a case that a HARQ parameter is configured for the terminal apparatus 1, which of the synchronous HARQ and the asynchronous HARQ is to apply to a corresponding HARQ process may be determined based on at least (1) whether Semi-Persistent Scheduling is used, (2) whether an uplink grant is a configured grant, and/or (3) whether the parameter skipUplinkTxSPS is configured.

For example, in a case that a HARQ parameter is configured for the terminal apparatus 1 and Semi-Persistent Scheduling is used, the synchronous HARQ may apply to a corresponding HARQ process.

For example, in a case that a HARQ parameter is configured for the terminal apparatus 1 and Semi-Persistent Scheduling is used, the asynchronous HARQ may apply to a corresponding HARQ process.

For example, in a case that a HARQ parameter is configured for the terminal apparatus 1 and Semi-Persistent Scheduling is not used, the synchronous HARQ or the asynchronous HARQ may apply to a corresponding HARQ process, based on the example described above.

For example, in a case that a HARQ parameter is configured for the terminal apparatus 1 and an uplink grant is a configured grant, the synchronous HARQ may apply to a corresponding HARQ process.

For example, in a case that a HARQ parameter is configured for the terminal apparatus 1 and an uplink grant is a configured grant, the asynchronous HARQ may apply to a corresponding HARQ process.

For example, in a case that a HARQ parameter is configured for the terminal apparatus 1 and an uplink grant is not a configured grant, the synchronous HARQ or the asynchronous HARQ may apply to a corresponding HARQ process, based on the example described above. An uplink grant that is not a configured grant may be an uplink grant corresponding to a C-RNTI.

For example, in a case that a HARQ parameter is configured for the terminal apparatus 1, an uplink grant is a configured grant, and the parameter skipUplinkTxSPS is configured, the synchronous HARQ may apply to a corresponding HARQ process.

For example, in a case that a HARQ parameter is configured for the terminal apparatus 1, an uplink grant is a configured grant, and the parameter skipUplinkTxSPS is not configured, the asynchronous HARQ may apply to a corresponding HARQ process.

Initial transmission in Semi-Persistent Scheduling will be described below.

In the initial transmission in Semi-Persistent Scheduling, basically, operation (processing) in the terminal apparatus 1 will be described. However, as a matter of course, the base station apparatus 3 performs similar operation (processing), corresponding to the operation (processing) of the terminal apparatus 1.

Here, transmission on a PUSCH (that may be transmission on a UL-SCH) is performed at a timing based on a System Fame Number (SFN) and a subframe. To be more specific, to determine a timing of performing transmission on a PUSCH, an SFN and a subframe number/index in a radio frame corresponding to the SFN are necessary. Here, the SFN is a radio frame number/index. The subframe is also referred to as a Transmission Time Interval (TTI).

For the purpose of simple description, the SFN (radio frame) and subframe transmitted on the PUSCH are also hereinafter simply described as a subframe. To be more specific, the subframe in the following description may include meanings of the SFN (radio frame) and subframe.

Here, the base station apparatus 3 may configure an interval (period) of the uplink Semi-Persistent Scheduling for the terminal apparatus 1. For example, the base station apparatus 3 may transmit a parameter semiPersistSched- IntervalUL for indicating an interval value of the uplink Semi-Persistent Scheduling to the terminal apparatus 1, by including the parameter semiPersistSchedIntervalUL in higher layer signaling (RRC message).

For example, by using the parameter semiPersistSchedIntervalUL, the base station apparatus 3 may configure, as an interval value of the Semi-Persistent Scheduling, 1 (1 subframe), 10 (10 subframes), 20 (20 subframes), 32 (32 subframes), 40 (40 subframes), 64 (64 subframes), 80 (80 subframes), 128 (128 subframes), 160 (160 subframes), 320 (320 subframes), and/or 640 (640 subframes).

To be more specific, by using the parameter semiPersistSchedIntervalUL, the base station apparatus 3 may configure 1 (1 subframe) as an interval value of the Semi-Persistent Scheduling.

For example, the parameter semiPersistSchedIntervalUL may be configured for each serving cell. The parameter semiPersistSchedIntervalUL may be configured for a primary cell. The interval value of the Semi-Persistent Scheduling "1 (1 subframe)" may be configured for a primary cell and/or a secondary cell (that may be configured for each serving cell).

The base station apparatus 3 may configure an uplink Semi-Persistent Scheduling resource for the terminal apparatus 1, by using an RRC message, a MAC control element, and/or an uplink DCI format (e.g., DCI format 0, DCI format OD).

The base station apparatus 3 may indicate to the terminal apparatus 1 to release an uplink Semi-Persistent Scheduling resource, by using an RRC message, a MAC control element, and/or an uplink DCI format (e.g., DCI format 0, DCI format OD).

The base station apparatus 3 may indicate to the terminal apparatus 1 to configure or release an uplink Semi-Persistent Scheduling resource, by using different methods for a first serving cell and a second serving cell. For example, the base station apparatus 3 may indicate to the terminal apparatus 1 to configure or release an uplink Semi-Persistent Scheduling resource in the first serving cell by using an uplink DCI format, and may indicate to the terminal apparatus 1 to configure or release an uplink Semi-Persistent Scheduling resource in the second serving cell by using an RRC message and/or a MAC control element. Here, the first serving cell may be a primary cell or a primary secondary cell. Here, the second serving cell may be an LAA secondary cell.

The base station apparatus 3 may configure an uplink Semi-Persistent Scheduling resource for the terminal apparatus 1 by using an RRC message. For example, the base station apparatus 3 may transmit a parameter semiPersistSchedResourceUL for indicating an uplink Semi-Persistent Scheduling resource to the terminal apparatus 1, by including the parameter semiPersistSchedResourceUL in higher layer signaling (RRC message). The base station apparatus 3 may indicate to the terminal apparatus 1 to activate transmission on a semi-persistent PUSCH, by using the parameter semiPersistSchedResourceUL. The base station apparatus 3 may indicate to the terminal apparatus 1 to release a semi-persistent PUSCH resource, by using the parameter semiPersistSchedResourceUL. The parameter semiPersistSchedResourceUL may include at least a part or all of the following information. (i) Information of a subframe including an uplink Semi-Persistent Scheduling resource, (ii) information of a subframe including an uplink Semi-Persistent Scheduling resource, (iii) an uplink grant, (iv) information of Resource block assignment and hopping resource allocation, (v) information of a Modulation and Coding Scheme (MCS), and (vi) information of Cyclic shift DMRS The base station apparatus 3 may configure multiple parameters semiPersistSchedResourceUL for one serving cell. To be more specific, the base station apparatus 3 may configure multiple sets of uplink Semi-Persistent Scheduling resources for one serving cell. The parameter may include an SPS index SPSId. The multiple parameters semiPersistSchedResourceUL corresponding to one serving cell may be identified by the index SPSId.

The terminal apparatus 1 may transmit an RRC message including a response to a parameter.

The base station apparatus 3 may indicate, by using a MAC control element, to the terminal apparatus 1 to activate or deactivate a semi-persistent PUSCH resource that is configured for the terminal apparatus 1 by using an RRC message (parameter semiPersistSchedResourceUL).

The base station apparatus 3 may indicate to the terminal apparatus 1 to activate a semi-persistent PUSCH resource, by using a MAC control element. The base station apparatus 3 may indicate to the terminal apparatus 1 to release a semi-persistent PUSCH resource, by using a MAC control element. A MAC control element for indicating activation or deactivation of a semi-persistent PUSCH resource is referred to as an activation/deactivation of SPS MAC control element.

Figure 3:
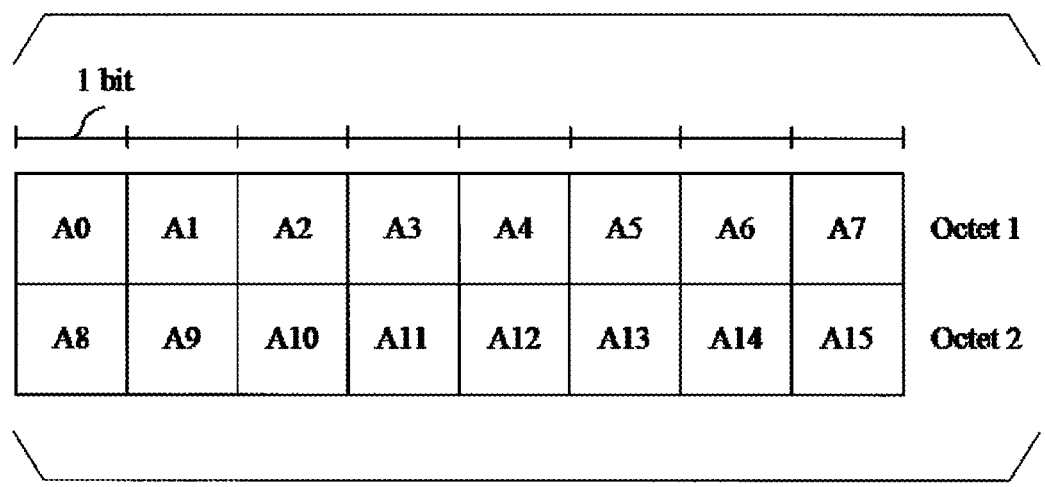
FIG. 3 is a diagram illustrating an example of an activation/deactivation of SPS MAC control element according to the present embodiment.

FIG. 3 is a diagram illustrating an example of an activation/deactivation of SPS MAC control element according to the present embodiment. In FIG. 3, the activation/deactivation of SPS MAC control element includes multiple Ai fields. One Ai field indicates activation or deactivation of a semi-persistent PUSCH resource in one serving cell. The Ai field may indicate activation or deactivation of a semi-persistent PUSCH resource in a serving cell corresponding to a serving cell index ServCellIndexi. The Ai field may indicate activation or deactivation of a semi-persistent PUSCH resource in one LAA secondary cell.

The Ai field may be set to '1' to indicate activation of a semi-persistent PUSCH resource in a serving cell. The Ai field may be set to '0' to indicate deactivation of a semi-persistent PUSCH resource in a serving cell.

Figure 4:
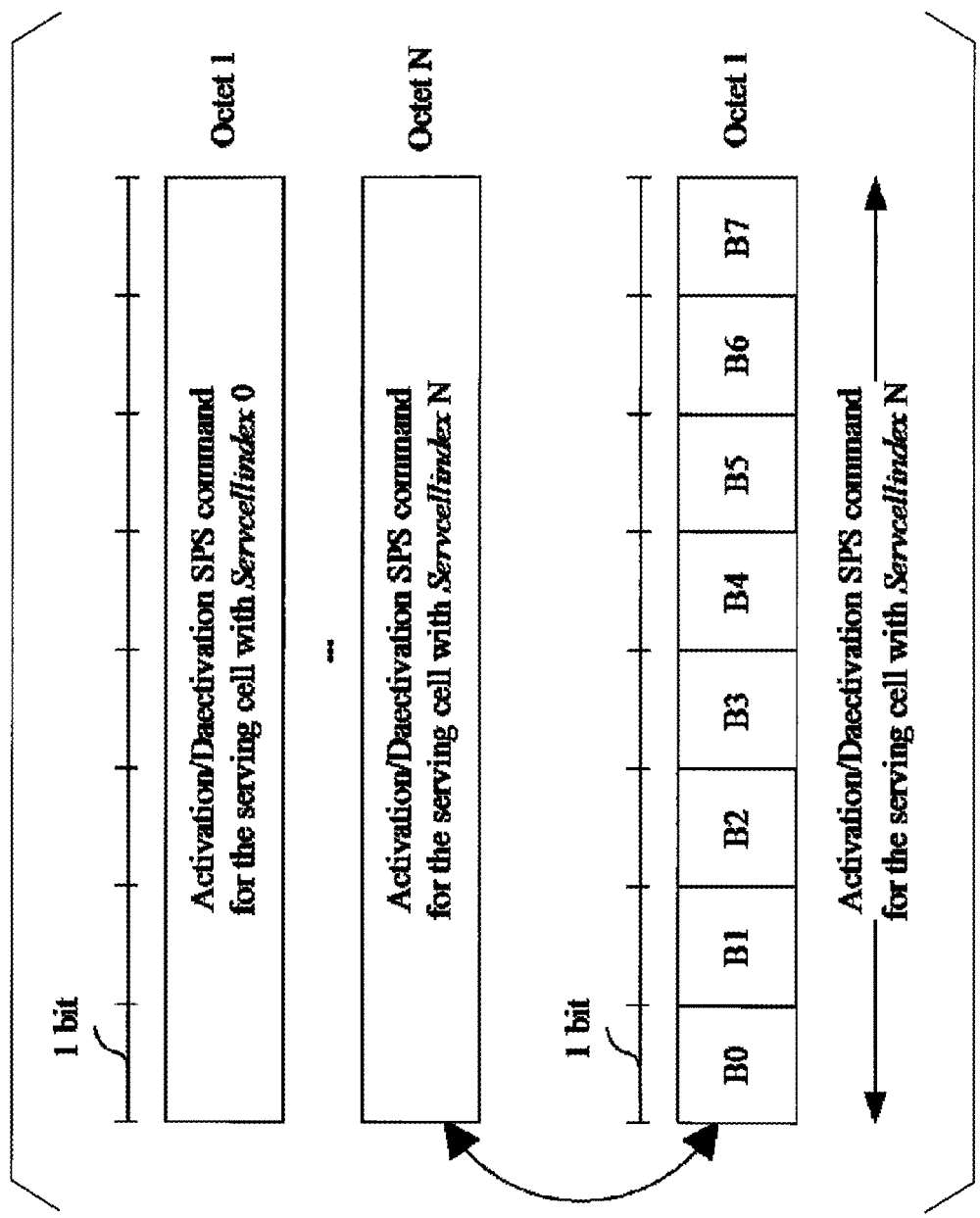
FIG. 4 is a diagram illustrating another example of the activation/deactivation of SPS MAC control element according to the present embodiment.

FIG. 4 is a diagram illustrating another example of the activation/deactivation of SPS MAC control element according to the present embodiment. In FIG. 4, the activation/deactivation of SPS MAC control element includes multiple activation/deactivation SPS commands. One activation/deactivation SPS command corresponds to one serving cell. One activation/deactivation SPS command includes multiple Bi fields. One Bi field indicates activation or deactivation of a semi-persistent PUSCH resource associated with one SPS index in one serving cell. The Bi field may indicate activation or deactivation of a semi-persistent PUSCH resource associated with an SPS index SPSIdi in a serving cell. The Bi field may indicate activation or deactivation of a semi-persistent PUSCH resource associated with the SPS index SPSIdi in an LAA secondary cell.

The Bi field may be set to '1' to indicate activation of a semi-persistent PUSCH resource associated with the SPS index SPSIdi in a serving cell. The Bi field may be set to '0' to indicate deactivation of a semi-persistent PUSCH resource associated with the SPS index SPSIdi in a serving cell.

The terminal apparatus 1 may transmit, to the base station apparatus 3, a response to the PDSCH (DL-SCH, transport block) including the activation/deactivation of SPS MAC control element, by using the PUCCH. Here, the response may be an ACK.

The base station apparatus 3 may use the uplink DCI format (e.g., DCI format 0, DCI format 0D) to allocate a semi-persistent (semi-permanent, semi-persistent or periodical) PUSCH resource (physical resource block) to the terminal apparatus 1, and indicate to the terminal apparatus 1 to activate the transmission on the semi-persistent PUSCH. The base station apparatus 3 may use the uplink DCI format to indicate to the terminal apparatus 1 to release the semi-persistent PUSCH resource.

For example, in a case that CRC parity bits added to the DCI format are scrambled with the SPS C-RNTI, and a field of information of a New data indicator (NDI) included within the DCI format is set to '0', the terminal apparatus 1 may verify (confirm, or check) whether multiple information fields included within the DCI format are set to specific values. To be more specific, the CRC parity bits added to the DCI format scrambled with the SPS C-RNTI and the field of the information of the NDI may be used for validation of the Semi-Persistent Scheduling.

Here, in a case that the verification is successful, the terminal apparatus 1 may consider (or may recognize) that the received DCI format indicates a valid semi-persistent activation or a valid semi-persistent release. In a case that the verification is not successful, the terminal apparatus 1 may discard (clear) this DCI format.

Here, the semi-persistent activation may include meaning of activation of the Semi-Persistent Scheduling. The semi-persistent activation may include meaning of semi-persistent allocation of the PUSCH resource. The semi-persistent release may include meaning of release of the Semi-Persistent Scheduling.

To be more specific, the DCI format may be used to indicate the activation of semi-persistent uplink scheduling. The DCI format may be used to enable activation of the Semi-Persistent Scheduling. The DCI format may be used to indicate the semi-persistent release.

FIG. 4 is a diagram illustrating an example of Special fields for activation of the Semi-Persistent Scheduling according to the present embodiment. As illustrated in FIG. 4, multiple fields may be defined for activation of the Semi-Persistent Scheduling. A predetermined value (that may be a specific value) set in each of multiple fields may be defined for activation of the Semi-Persistent Scheduling.

As illustrated in FIG. 4, for example, in a case that the uplink DCI format (e.g., DCI format 0) is used for activation of the Semi-Persistent Scheduling, a field of information of a TPC command for a scheduled PUSCH may be set to '00', a field of information of a Cyclic shift DMRS may be set to '000', and the most significant bit (MSB) of a field of information of a Modulation and coding scheme (MCS) and a redundancy version may be set to '0', which are included within the uplink DCI format.

For example, in a case that the uplink DCI format (e.g., DCI format 0D) is used for activation of the Semi-Persistent Scheduling, a field of information of a TPC command for a scheduled PUSCH may be set to '00', a field of information of a Cyclic shift DMRS may be set to '000', the most significant bit (MSB) of a field of information of a Modulation and coding scheme (MCS) and a redundancy version may be set to '0', and a field of information of a HARQ process number may be set to all "0", which are included within the uplink DCI format.

For example, in a case that the downlink DCI format (e.g., DCI format 1 and/or DCI format 1A) is used for activation of the Semi-Persistent Scheduling, a field of information of a HARQ process number may be set to '000 (for FDD)' or '0000 (for TDD)', the most significant bit (MSB) of a field of information of a Modulation and Coding scheme (MCS) may be set to '0', and a field of information of a redundancy version may be set to '00', which are included within the downlink DCI format.

To be more specific, in a case that each of multiple information fields included within the DCI format is set to a specific value defined in advance, the terminal apparatus 1 may activate the Semi-Persistent Scheduling. Here, the multiple information fields and predetermined values to be set in the information fields which are used for activation of the Semi-Persistent Scheduling are not limited to the examples described above, as a matter of course. For example, the multiple information fields and the predetermined values to be set in the information fields which are used for activation of the Semi-Persistent Scheduling may be defined by specifications or the like in advance, and may be configured as known information between the base station apparatus 3 and the terminal apparatus 1.

FIG. 5 is a diagram illustrating an example of Special fields for release of the Semi-Persistent Scheduling according to the present embodiment. As illustrated in FIG. 5, multiple fields may be defined for release of the Semi-Persistent Scheduling. A predetermined value (that may be a specific value) set in each of multiple fields may be defined for release of the Semi-Persistent Scheduling.

As illustrated in FIG. 5, for example, in a case that the uplink DCI format (e.g., DCI format 0) is used for release of the Semi-Persistent Scheduling, a field of information of a TPC command for a scheduled PUSCH may be set to '00', a field of information of a Cyclic shift DMRS may be set to '000', a field of information of a Modulation and coding scheme (MCS) and a redundancy version may be set to '11111', and a field of information of Resource block assignment and hopping resource allocation may be set to all '1', which are included within the uplink DCI format.

To be more specific, in a case that the uplink DCI format is used for release of the Semi-Persistent Scheduling, the field associated with the resource block assignment (resource allocation) may be set to a value defined in advance for release.

For example, in a case that the uplink DCI format (e.g., DCI format 0D) is used for release of the Semi-Persistent Scheduling, a field of information of a TPC command for a scheduled PUSCH may be set to '00', a field of information of a Cyclic shift DMRS may be set to '000', a field of information of a Modulation and coding scheme (MCS) and a redundancy version may be set to '11111', a field of information of Resource block assignment and hopping resource allocation may be set to all '1', and a field of information of a HARQ process number may be set to all "0", which are included within the uplink DCI format.

For example, in a case that the downlink DCI format (e.g., DCI format 1 and/or DCI format 1A) is used for release of the Semi-Persistent Scheduling, a field of information of a HARQ process number may be set to '000 (for FDD)' or '0000 (for TDD)', a field of information of a Modulation and Coding scheme (MCS) may be set to '11111', a field of information of a redundancy version may be set to '00', and a field of information of Resource block assignment (that may be all fields of multiple fields) may be set to '1', which are included within the downlink DCI format.

To be more specific, in a case that the downlink DCI format is used for release of the Semi-Persistent Scheduling, the field associated with the resource block assignment (resource allocation) may be set to a value defined in advance for release.

To be more specific, in a case that each of multiple information fields included within the DCI format is set to a specific value defined in advance, the terminal apparatus 1 may release the Semi-Persistent Scheduling. Here, the multiple information fields and predetermined values to be set in the information fields which are used for release of the Semi-Persistent Scheduling are not limited to the examples described above, as a matter of course. For example, the multiple information fields and the predetermined values to be set in the information fields which are used for release of the Semi-Persistent Scheduling may be defined by specification or the like in advance, and may be configured as known information between the base station apparatus 3 and the terminal apparatus 1.

The DCI format used to indicate activation or release of semi-persistent uplink scheduling may include an information field used to indicate the SPS index SPSId. To be more specific, the DCI format, the DCI format may be used to indicate activation or release of semi-persistent uplink scheduling associated with the SPS index SPSId. The Information field used to indicate the SPS index SPSId may be a field of information of a TPC command for a scheduled PUSCH, a field of information of a Cyclic shift DMRS, or a field of information of a HARQ process number.

For example, the DCI format to which the CRC parity bits scrambled with the SPS C-RNTI are added may be transmitted to the secondary cell in a case that "1 (1 subframe)" is configured as the interval value of the Semi-Persistent Scheduling for the secondary cell. For example, the DCI format to which the CRC parity bits scrambled with the SPS C-RNTI are added may be transmitted to the secondary cell in a case that an interval shorter than "10 (10 subframes)" is configured as the interval value of the Semi-Persistent Scheduling for the secondary cell.

Here, the terminal apparatus 1 needs to have a valid uplink grant for performing the transmission on the UL-SCH (transmission on the UL-SCH via the PUSCH, transmission of the UL-SCH on the PUSCH). Here, the uplink grant may include meaning that uplink transmission in a certain subframe is granted (allowed, or given).

For example, the valid uplink grant may be dynamically received on the PDCCH. To be more specific, the valid uplink grant may be indicated by using the DCI format to which the CRC parity bits scrambled with the C-RNTI are added. The uplink grant dynamically received on the PDCCH is also referred to as an uplink grant corresponding to the C-RNTI.

The valid uplink grant may be semi-permanently configured. To be more specific, the valid uplink grant may be indicated by using the DCI format to which the CRC parity bits scrambled with the SPS C-RNTI are added.

The terminal apparatus 1 may store the uplink grant dynamically received on the PDCCH and/or the semi-permanently configured uplink grant. Here, the HARQ entity may deliver the uplink grant dynamically received on the PDCCH and/or the semi-permanently configured uplink grant to a HARQ process, and the HARQ process may store the uplink grant received from the HARQ entity. Hereinafter, the uplink grant dynamically received on the PDCCH and/or semi-permanently configured uplink grant which are to be stored are referred to as a stored uplink grant.

In a case that the semi-persistent activation is indicated, the terminal apparatus 1 (MAC entity) may store the uplink grant received from the base station apparatus 3 as an uplink grant to be configured. Here, the uplink grant may be included in the PDCCH or the parameter semiPersistSchedResourceUL. The terminal apparatus 1 (MAC entity) may store the uplink grant included in the parameter semiPersistSchedResourceUL as an uplink grant to be configured. Here, the configured uplink grant may be referred to as a configured Semi-Persistent Scheduling uplink grant (SPS UL grant), or a configured grant. The configured uplink grant may be referred to as a configured uplink grant, a configured Semi-Persistent Scheduling uplink grant (SPS UL grant), or a configured grant.

Here, based on that the uplink grant (SPS UL grant) stored by the MAC entity is cleared, the uplink grant (SPS UL grant) stored by the HARQ process may not be cleared. To be more specific, even in a case that the uplink grant (SPS UL grant) stored by the MAC entity is cleared, retransmission on the semi-persistent PUSCH can be continued based on the uplink grant (SPS UL grant) stored by the HARQ process.

The Semi-Persistent Scheduling uplink grant may also be referred to as an SPS uplink grant, a Semi-Persistent grant, and a Semi-persistent scheduling assignment.

The base station apparatus 3 may configure the Semi-Persistent Scheduling to be valid or invalid for the terminal apparatus 1. For example, the base station apparatus 3 may configure the Semi-Persistent Scheduling to be valid or invalid by using higher layer signaling (e.g., RRC layer signaling).

In a case that the Semi-Persistent Scheduling is configured to be valid, the SPS C-RNTI, a parameter for indicating the interval value of the uplink Semi-Persistent Scheduling, a parameter for indicating the Number of first empty transmissions before release (also referred to as a parameter implicitReleaseAfter), and/or an SPS deactivation timer (also referred to as a parameter skipUplinkTxSPS) may be at least provided (configured). Here, the empty transmission (also referred to as transmission of empty) will be described later. The parameter implicitReleaseAfter and the parameter skipUplinkTxSPS will be described later.

Here, for example, the terminal apparatus 1 starts transmission on the semi-persistent PUSCH in a certain subframe, and then, may initialize or re-initialize the uplink grant to be configured such that the transmission on the semi-persistent PUSCH recurs based on Equation 1. To be more specific, the terminal apparatus 1 may sequentially consider that the configured uplink grant occurs in a subframe satisfying Equation 1.

$$(10*SFN+\text{subframe}) = [(10*SFN_{start\_time} + \text{subframe}_{start\_time}) + N*\text{semiPersistSchedIntervalUL} + \text{Subframe\_Offset}*(N \bmod 2)] \bmod 10240 \quad \text{Equation 1}$$

To be more specific, the terminal apparatus 1, after configuring the SPS uplink grant, may set a value of Subframe_Offset, and may recognize (or may consider sequentially) that the N-th grant (uplink grant to be configured, SPS uplink grant) occurs in the subframe specified based on Equation 1.

Here, the subframe satisfying Equation 1 is also referred to as a subframe satisfying a predetermined condition. The subframes among the subframes satisfying Equation 1 except for the first subframe are also referred to as subframes satisfying a predetermined condition. Here, the first subframe among the subframes satisfying Equation 1 may be a subframe for receiving the DCI used to indicate the activation, reactivation or release of the Semi-Persistent Scheduling.

To be more specific, the terminal apparatus 1 may specify the subframe for the transmission on the PUSCH corresponding to the N-th uplink grant to be configured, based on Equation 1, after configuring the stored DCI format as the SPS uplink grant. Here, in Equation 1, SFN and subframe represent the SFN and subframe, respectively, transmitted on the PUSCH.

In Equation 1, $SFN_{start\_time}$ and $subframe_{start\_time}$ represent the SFN and subframe, respectively, at the time point when the configured uplink grant is initialized or re-initialized. To be more specific, $SFN_{start\_time}$ and $subframe_{start\_time}$ represent the SFN and subframe starting the transmission on the PUSCH, based on the configured uplink grant (i.e., the subframe for an initial transmission on the PUSCH corresponding to the 0-th configured uplink grant).

In Equation 1, semiPersistSchedIntervalUL represents the interval of the uplink Semi-Persistent Scheduling. In Equation 1, Subframe_Offset represents an offset value used to specify the subframe for the transmission on the PUSCH.

Here, the terminal apparatus 1 may set Subframe_Offset in Equation 1 to '0' in a case that a parameter (twoIntervalConfig) is not configured to be valid by a higher layer after the SPS uplink grant is configured.

The initialization may be performed in a case that the Semi-Persistent Scheduling is not activated. The re-initialization may be performed in a case that the Semi-Persistent Scheduling is already activated. Here, the initialization may include meaning of initial configuration, and the re-initialization may include meaning of re-initial configuration. To be more specific, the terminal apparatus 1 may initialize or re-initialize the configured uplink grant to start the transmission on the PUSCH in a certain subframe.

Figure 6:
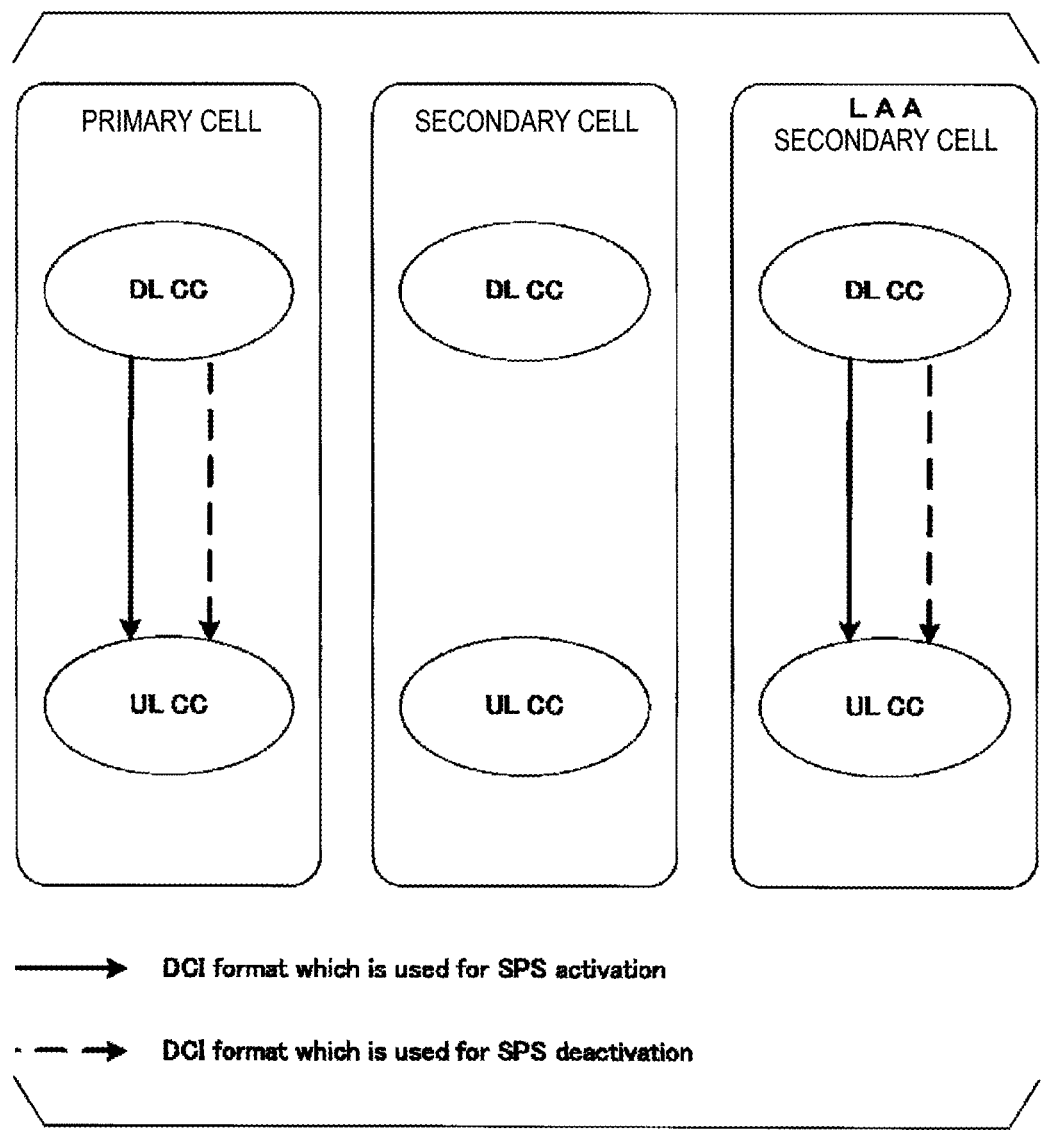
FIG. 6 is a diagram for illustrating an example of a transmission method of a DCI format used to indicate activation or deactivation of a semi-persistent PUSCH resource according to the present embodiment.
Figure 7:
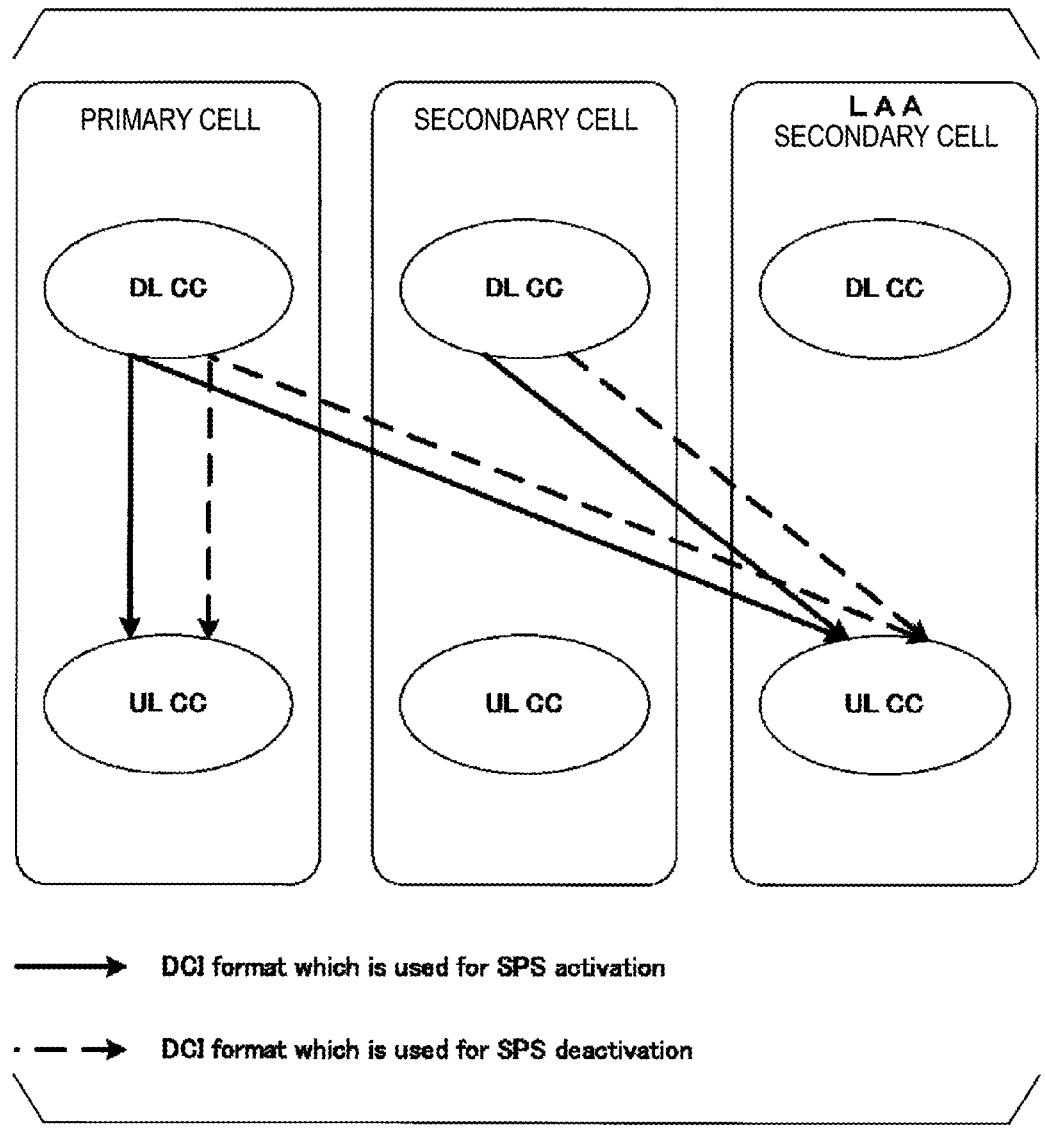
FIG. 7 is a diagram for illustrating an example of a transmission method of a DCI format used to indicate activation or deactivation of a semi-persistent PUSCH resource according to the present embodiment.
Figure 8:
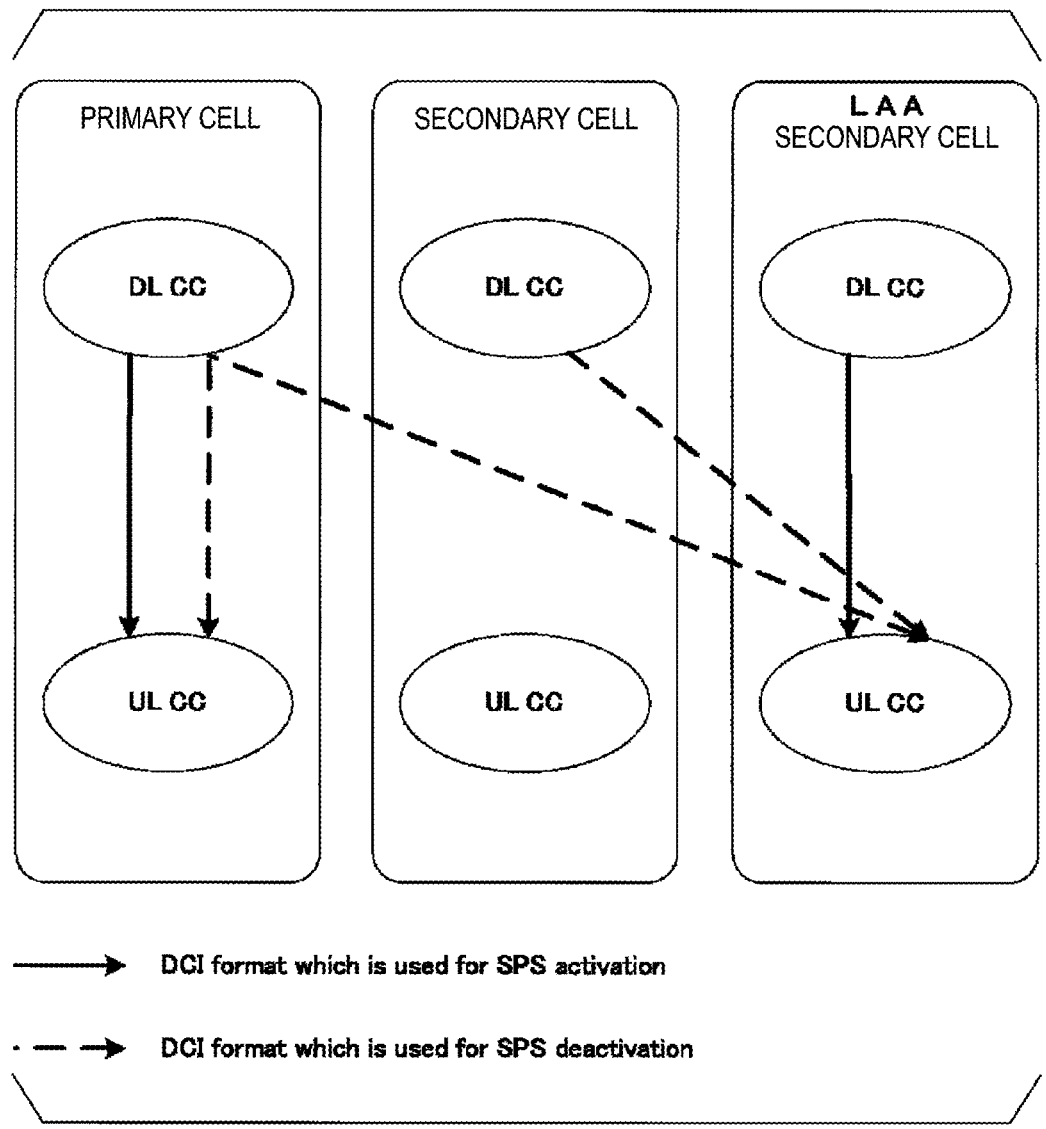
FIG. 8 is a diagram for illustrating an example of a transmission method of a DCI format used to indicate activation or deactivation of a semi-persistent PUSCH resource according to the present embodiment.

Each of FIG. 6 to FIG. 8 is a diagram for illustrating an example of a transmission method of a DCI format used to indicate activation or deactivation of a semi-persistent PUSCH resource according to the present embodiment. In FIG. 6 to FIG. 8, DL CC represents a downlink component carrier, and UL CC represents an uplink component carrier. In FIG. 6 to FIG. 8, the solid arrow represents a DCI format used to indicate activation of a semi-persistent PUSCH resource, and the dotted arrow represents a DCI format used to indicate activation of a semi-persistent PUSCH resource.

The DCI format used to indicate activation or deactivation of a semi-persistent PUSCH resource in a primary cell may be transmitted only in the primary cell. The DCI format used to indicate activation or deactivation of a semi-persistent PUSCH resource in a primary secondary cell may be transmitted only in the primary secondary cell.

The DCI format used to indicate activation or deactivation of a semi-persistent PUSCH resource in an LAA secondary cell may be transmitted only in the LAA secondary cell. The DCI format used to indicate activation or deactivation of a semi-persistent PUSCH resource in an LAA secondary cell may be transmitted in a primary cell or a secondary cell.

The DCI format used to indicate activation of a semi-persistent PUSCH resource in an LAA secondary cell may be transmitted in the LAA secondary cell, and the DCI format used to indicate deactivation of a semi-persistent PUSCH resource in the LAA secondary cell may be transmitted in a primary cell or a secondary cell. To be more specific, the DCI format used to indicate activation of a semi-persistent PUSCH resource in an LAA secondary cell and the DCI format used to indicate deactivation of a semi-persistent PUSCH resource in the LAA secondary cell may be transmitted in different serving cells.

The terminal apparatus 1 may receive, from the base station apparatus 3, information for indicating a serving cell in which the DCI format used to indicate activation of a semi-persistent PUSCH resource in an LAA secondary cell is transmitted. The terminal apparatus 1 may receive, from the base station apparatus 3, information for indicating a serving cell in which the DCI format used to indicate deactivation of a semi-persistent PUSCH resource in an LAA secondary cell is transmitted.

FIG. 9 is a diagram for illustrating an example of Non-empty transmission and Empty transmission according to the present embodiment. As illustrated in FIG. 9, a MAC Protocol Data Unit (MAC PDU) may include a MAC header, a MAC Service Data Unit (MAC SDU), a MAC Control Element (MAC CE), and padding (padding bits). Here, the MAC protocol data unit may correspond to the uplink data (UL-SCH). The MAC header may include one or multiple MAC subheaders. The MAC subheader corresponds to one MAC control element or one MAC service data unit. The MAC subheader may include a logical channel identifier corresponding to a MAC control element. The MAC subheader may include a logical channel identifier corresponding to one MAC service data unit.

Here, as the MAC control element, multiple MAC control elements may be defined that include at least an SPS confirmation MAC control element (SPS confirmation MAC CE), a Buffer Status Report MAC control element (Buffer Status Report MAC CE (BSR MAC CE), which is a MAC control element used for a buffer status report), a Timing Advance Command MAC control element (Timing Advance Command MAC CE (TAC MAC CE), which is a MAC control element used to transmit a timing advance command), a Power Headroom Report MAC control element (Power Headroom Report MAC CE (PHR MAC CE), which is a MAC control element used for a power headroom report), and/or an Activation/Deactivation MAC control element (Activation/Deactivation MAC CE, which is a MAC control element used to transmit an activation/deactivation command), and an activation/deactivation of SPS MAC control element.

There may be defined, as the buffer status report, multiple buffer status reports including at least a Regular BSR, a Periodic BSR, and a Padding BSR. For example, the Regular BSR, the Periodic BSR, and the Padding BSR may be triggered based on events (conditions) different from each other.

For example, the Regular BSR may be triggered in a case that data for a logical channel which belongs to a certain Logical Channel Group (LCG) becomes available for transmission, and priority for the transmission of the data is higher than the logical channels which belong to any LCG and for which data is already available for transmission, or in a case that there is no available data for transmission on the logical channels which belong to any LCG. The Regular BSR may be triggered in a case that a predetermined timer (retxBSR-Timer) expires, and the terminal apparatus 1 has data that can be transmitted in a logical channel belonging to a certain LCG.

The Periodic BSR may be triggered in a case that a predetermined timer (periodicBSR-Timer) expires. The Padding BSR may be triggered in a case that the UL-SCH is allocated, and the number of padding bits is equal to or larger than a size of the buffer status report MAC control element plus its subheader.

The terminal apparatus 1 may use the buffer status report to notify the base station apparatus 3 of a transmission data buffer size of the uplink data corresponding to each LCG as a message in the MAC layer.

Figure 10:
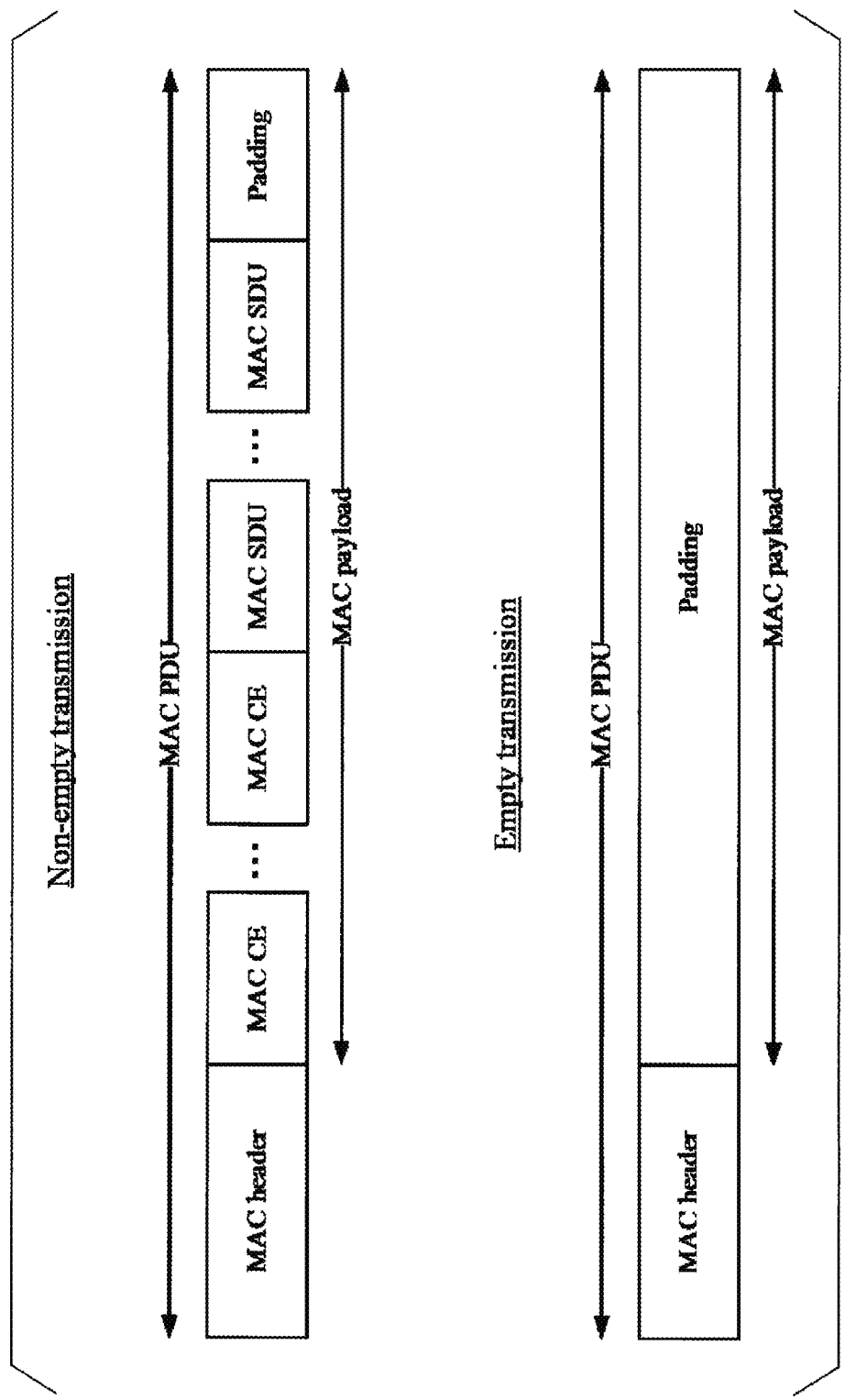
FIG. 10 is a diagram for illustrating an example of a MAC protocol data unit according to the present embodiment.

As illustrated in FIG. 10, the MAC protocol data unit may contain zero, one, or multiple MAC service data units. The MAC protocol data unit may contain zero, one, or multiple MAC control elements. Padding may occur at the end of the MAC protocol data unit (MAC PDU).

Figure 11:
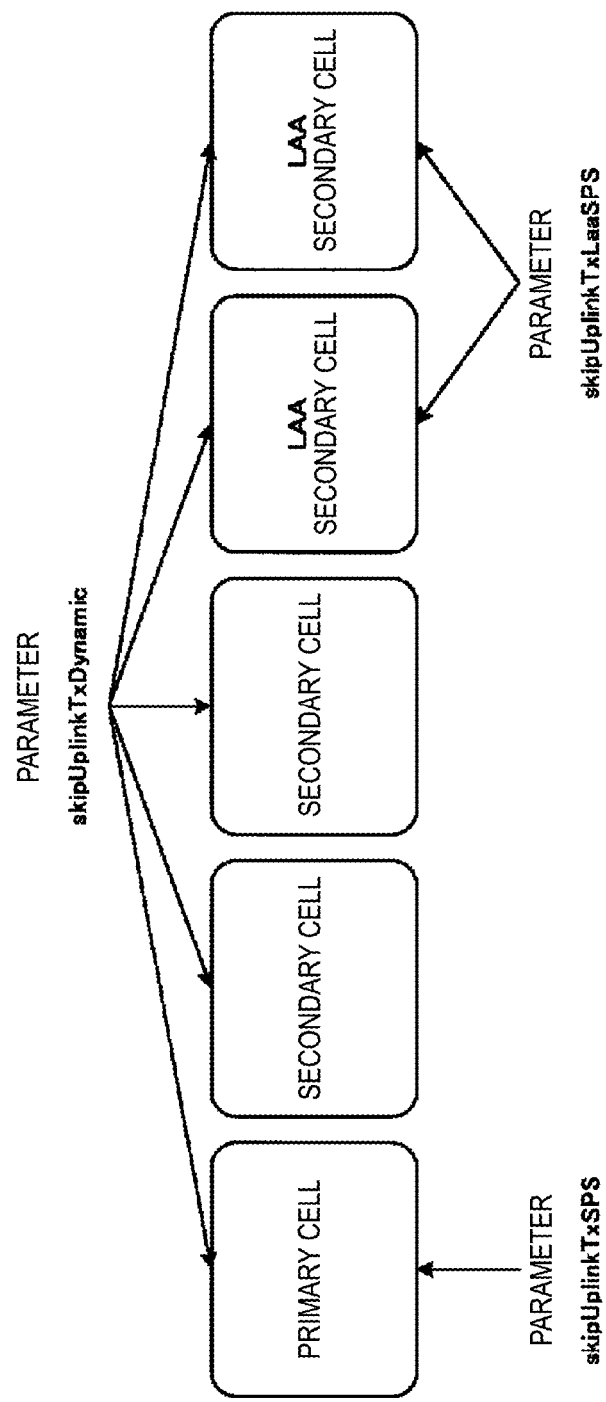
FIG. 11 is a diagram illustrating an example of a correspondence between a parameter skipUplinkTxSPS, a parameter skipUplinkTxLaaSPS, a parameter skipUplinkTxDynamic, and serving cells according to the present embodiment.
Figure 12:
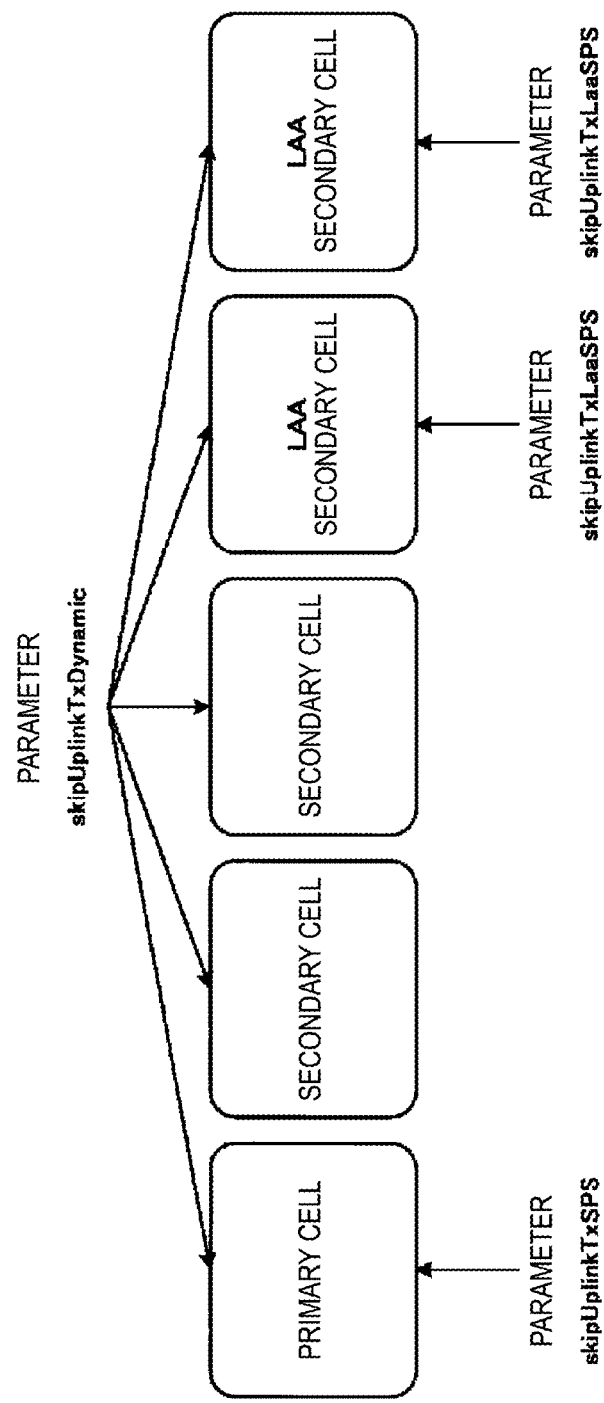
FIG. 12 is a diagram illustrating an example of a correspondence between a parameter skipUplinkTxSPS, a parameter skipUplinkTxLaaSPS, a parameter skipUplinkTxDynamic, and serving cells according to the present embodiment.

Each of FIG. 11 and FIG. 12 is a diagram illustrating an example of a correspondence between the parameter skipUplinkTxSPS, the parameter skipUplinkTxLaaSPS, the parameter skipUplinkTxDynamic, and serving cells according to the present embodiment.

The base station apparatus 3 may transmit the parameter skipUplinkTxSPS to the terminal apparatus 1. For example, the base station apparatus 3 may transmit the parameter skipUplinkTxSPS by using higher layer signaling (e.g., RRC layer signaling). The parameter skipUplinkTxSPS is used to determine whether to skip uplink transmission corresponding to a grant configured for a primary cell. In a case that the parameter skipUplinkTxSPS is configured and there is no available data for transmission in a buffer of the terminal apparatus 1, the terminal apparatus 1 skips uplink transmission corresponding to a grant configured for a primary cell. Here, the uplink transmission may be PUSCH transmission. The uplink transmission corresponding to a configured grant is an uplink transmission in a Semi-Persistent Scheduling resource.

The base station apparatus 3 may transmit the parameter skipUplinkTxLaaSPS to the terminal apparatus 1. For example, the base station apparatus 3 may transmit the parameter skipUplinkTxLaaSPS by using higher layer signaling (e.g., RRC layer signaling). The parameter skipUplinkTxLaaSPS may be used to determine whether to skip uplink transmission corresponding to a grant configured for an LAA secondary cell. In a case that the parameter skipUplinkTxLaaSPS is configured and there is no available data for transmission in a buffer of the terminal apparatus 1, the terminal apparatus 1 skips uplink transmission corresponding to a grant configured for an LAA secondary cell. Here, the uplink transmission may be PUSCH transmission. The parameter skipUplinkTxLaaSPS may correspond to multiple LAA secondary cells. The parameter skipUplinkTxLaaSPS may be defined for each of the multiple LAA secondary cells. To be more specific, one parameter skipUplinkTxLaaSPS may correspond to one LAA secondary cell.

The base station apparatus 3 may transmit the parameter skipUplinkTxDynamic to the terminal apparatus 1. For example, the base station apparatus 3 may transmit the parameter skipUplinkTxDynamic by using higher layer signaling (e.g., RRC layer signaling). The parameter skipUplinkTxDynamic is used to determine whether to skip uplink transmission corresponding to an uplink grant corresponding to a C-RNTI. In a case that the parameter skipUplinkTxDynamic is configured and there is no available data for transmission in a buffer of the terminal apparatus 1, the terminal apparatus 1 skips uplink transmission corresponding to an uplink grant corresponding to a C-RNTI. Here, the uplink transmission may be PUSCH transmission. The parameter skipUplinkTxDynamic may apply to multiple serving cells. Here, the multiple serving cells may include a secondary cell and an LAA secondary cell. The uplink transmission corresponding to an uplink grant corresponding to a C-RNTI is dynamically scheduled uplink transmission.

The terminal apparatus 1 may determine to skip uplink transmission corresponding to a grant configured for an LAA secondary cell, irrespective of the parameter skipUplinkTxLaaSPS. The terminal apparatus 1 does not transmit a MAC protocol data unit not including available data for transmission by using a semi-persistent PUSCH resource in an LAA secondary cell. To be more specific, the terminal apparatus 1 may transmit only a MAC protocol data unit including available data for transmission by using a semi-persistent PUSCH resource in an LAA secondary cell.

Here, available data for transmission may include a MAC service data unit, a first MAC control element, and aperiodic channel state information. The first MAC control element may include an SPS confirmation MAC control element, a buffer status report MAC control element for a Regular BSR, and a power headroom report MAC control element. The available data for transmission does not include a second MAC control element. The second MAC control element includes a buffer status report MAC control element for a Padding BSR, and a buffer status report for a Periodic BSR.

In the following, a state that a MAC protocol data unit includes a MAC service data unit may mean a state that a MAC protocol data unit includes a MAC service data unit and a MAC subheader for the MAC service data unit. In the following, a state that a MAC protocol data unit includes a MAC control element may mean a state that a MAC protocol data unit includes a control element and a MAC subheader for the control element.

To be more specific, a MAC protocol data unit including available data for transmission may be a MAC protocol data unit including at least one of a MAC service data unit and a first MAC control element.

To be more specific, a MAC protocol data unit not including available data for transmission may be (1) a MAC protocol data unit not including a MAC service data unit and a first MAC control element, (2) a MAC protocol data unit not including a MAC service data unit and a first MAC control element and including a second MAC control element, or (3) a MAC protocol data unit not including a MAC service data unit and including only a second MAC control element.

Aperiodic channel state information reporting may be requested (triggered) by the downlink control information. The aperiodic channel state information reporting is performed by using a PUSCH. The terminal apparatus 1 may transmit both the MAC protocol data unit and the aperiodic channel state information, by using the PUSCH.

Whether to skip uplink transmission is determined for each subframe.

Skipping of the uplink transmission may be defined as operation (processing) in the first entity and the HARQ entity in the terminal apparatus 1. The HARQ entity identifies a HARQ process associated with a subframe. The HARQ entity obtains a MAC protocol data unit from the first entity. The HARQ entity indicates an uplink grant for the first entity. In a case that the HARQ entity successfully obtains a MAC protocol data unit from the first entity, the HARQ entity delivers the MAC protocol data unit to an identified HARQ process, and indicates to the identified HARQ process to trigger initial transmission. In a case that the HARQ entity fails to obtain a MAC protocol data unit from the first entity, the HARQ entity does not indicate to the HARQ process to trigger the initial transmission.

The first entity generates a MAC protocol data unit, and delivers the generated MAC protocol data unit to the HARQ entity. The first entity does not generate a MAC protocol data unit in a case that the following conditions are satisfied.

The first entity does not generate a MAC protocol data unit for the HARQ entity in a case that (1) transmission of aperiodic channel state information in this subframe is not requested, (2) the MAC protocol data unit does not include a MAC service data unit, (3) the MAC protocol data unit includes a second MAC control element, (4) the parameter skipUplinkTxSPS is configured, and (5) an uplink grant indicated by the HARQ entity is a configured grant. To be more specific, the first entity does not generate a MAC protocol data unit for the HARQ entity in a case that (1) transmission of aperiodic channel state information in this subframe is not requested, (2) the MAC protocol data unit does not include available data for transmission, (3) the parameter skipUplinkTxSPS is configured, and (4) an uplink grant indicated by the HARQ entity is a configured grant. Here, an uplink grant other than a configured grant may be an uplink grant corresponding to a C-RNTI.

The first entity does not generate a MAC protocol data unit for the HARQ entity in a case that (1) transmission of aperiodic channel state information in this subframe is not requested, (2) the MAC protocol data unit does not include a MAC service data unit, (3) the MAC protocol data unit includes a second MAC control element, (4) the parameter skipUplinkTxDynamic is configured, and (5) an uplink grant indicated by the HARQ entity is an uplink grant other than a configured grant. To be more specific, the first entity does not generate a MAC protocol data unit for the HARQ entity in a case that (1) transmission of aperiodic channel state information in this subframe is not requested, (2) the MAC protocol data unit does not include available data for transmission, (3) the parameter skipUplinkTxDynamic is configured, and (4) an uplink grant indicated by the HARQ entity is an uplink grant other than a configured grant. Here, an uplink grant other than a configured grant may be an uplink grant corresponding to a C-RNTI.

To be more specific, skipping of the uplink transmission means that no MAC protocol data unit is generated, or that no indication is performed to a HARQ process to trigger initial transmission.

A state that "Transmission of aperiodic channel state information in this subframe is not requested, the MAC protocol data unit does not include a MAC service data unit, and the MAC protocol data unit includes a second MAC control element" may mean a state that "the MAC protocol data unit does not include available data for transmission".

A state that "The MAC protocol data unit does not include a MAC service data unit, and the MAC protocol data unit includes a second MAC control element" may mean a state that "the MAC protocol data unit does not include a MAC service data unit and a first MAC control element".

In a case that release of Semi-Persistent Scheduling is indicated and the parameter skipUplinkTxSPS is not configured, the terminal apparatus 1 clears the configured grant.

In a case that release of Semi-Persistent Scheduling is indicated and the parameter skipUplinkTxSPS is configured, the terminal apparatus 1 may trigger SPS confirmation. In a case that activation of Semi-Persistent Scheduling is indicated and the parameter skipUplinkTxSPS is configured, the terminal apparatus 1 may trigger SPS confirmation.

In a case that release of Semi-Persistent Scheduling for a primary cell is indicated and the parameter skipUplinkTxSPS for the primary cell is configured, the terminal apparatus 1 may trigger SPS confirmation for the primary cell. In a case that activation of Semi-Persistent Scheduling for a primary cell is indicated and the parameter skipUplinkTxSPS for the primary cell is configured, the terminal apparatus 1 may trigger SPS confirmation for the primary cell.

In a case that release of Semi-Persistent Scheduling for an LAA secondary cell is indicated and the parameter skipUplinkTxLaaSPS for the LAA secondary cell is configured, the terminal apparatus 1 may trigger SPS confirmation for the LAA secondary cell. In a case that activation of Semi-Persistent Scheduling for an LAA secondary cell is indicated and the parameter skipUplinkTxLaaSPS for the LAA secondary cell is configured, the terminal apparatus 1 may trigger SPS confirmation for the LAA secondary cell.

In a case that SPS confirmation for a primary cell is triggered and is not canceled, and the terminal apparatus 1 has uplink resources to be allocated for initial transmission in this subframe, the terminal apparatus 1 indicates to the first entity to generate an SPS confirmation MAC control element for the primary cell, and cancels the SPS confirmation triggered for the primary cell. Here, the uplink resources are PUSCH resources. To be more specific, the SPS confirmation MAC control element for the primary cell is a response to DCI for activation of Semi-Persistent Scheduling for the primary cell. To be more specific, the SPS confirmation MAC control element for the primary cell is a response to DCI for release of Semi-Persistent Scheduling for the primary cell.

In a case that SPS confirmation for an LAA secondary cell is triggered and is not canceled, and the terminal apparatus 1 has uplink resources to be allocated for initial transmission in this subframe, the terminal apparatus 1 indicates to the first entity to generate an SPS confirmation MAC control element for the LAA secondary cell, and cancels the SPS confirmation triggered for the LAA secondary cell. Here, the uplink resources are PUSCH resources. To be more specific, the SPS confirmation MAC control element for the LAA secondary cell is a response to DCI for activation of Semi-Persistent Scheduling for the LAA secondary cell. To be more specific, the SPS confirmation MAC control element for the LAA secondary cell is a response to DCI for release of Semi-Persistent Scheduling for the LAA secondary cell.

The SPS confirmation MAC control element corresponding to a primary cell and the SPS confirmation MAC control element for an LAA secondary cell may be individually defined. The MAC subheader corresponding to a MAC control element includes an LCID field including a logical channel identity (LCID) corresponding to the MAC control element. The SPS confirmation MAC control element corresponding to a primary cell and the SPS confirmation MAC control element corresponding to an LAA secondary cell may correspond to different LCIDs.

The SPS confirmation MAC control element corresponding to a primary cell may be identified by the MAC subheader. The SPS confirmation MAC control element corresponding to a primary cell may be zero bits.

Figure 13:
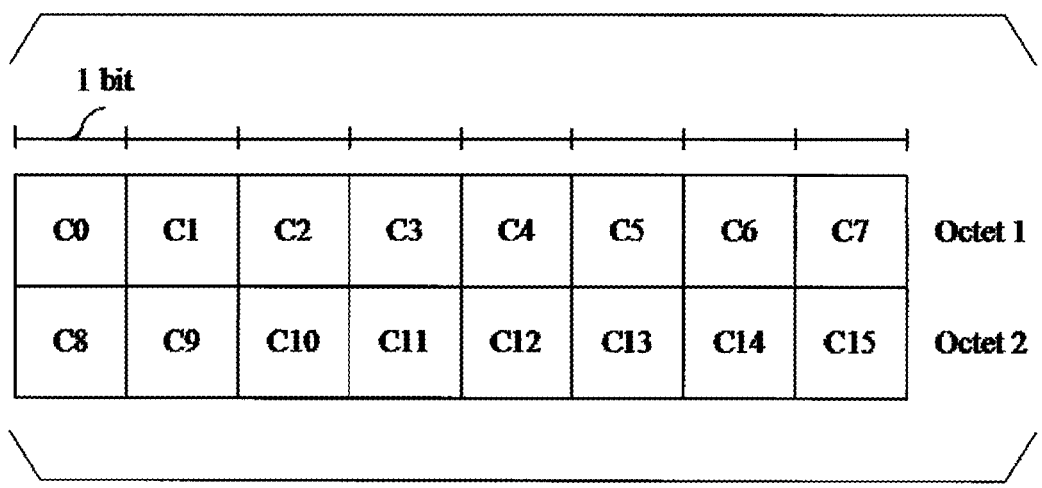
FIG. 13 is a diagram illustrating an example of an SPS confirmation MAC control element corresponding to an LAA secondary cell according to the present embodiment.

The SPS confirmation MAC control element corresponding to an LAA secondary cell may be more than zero bits. FIG. 13 is a diagram illustrating an example of the SPS confirmation MAC control element corresponding to an LAA secondary cell according to the present embodiment. In FIG. 13, the SPS confirmation MAC control element corresponding to an LAA secondary cell includes multiple Ci fields. One Ci field may indicate SPS confirmation for one LAA secondary cell. The Ci field may indicate SPS confirmation for an LAA secondary cell corresponding to the serving cell index ServCellIndexi. The Ci field may be set to '1' to indicate SPS confirmation for an LAA secondary cell. The Ci field may be set to '0' in order not to indicate SPS confirmation for an LAA secondary cell.

One Ci field may indicate that a semi-persistent PUSCH resource is activated or deactivated in one LAA secondary cell. The Ci field may indicate that a semi-persistent PUSCH resource in an LAA secondary cell corresponding to the serving cell index ServCellIndexi is activated or deactivated. The Ci field may be set to '1' to indicate activation of a semi-persistent PUSCH resource in an LAA secondary cell. The Ci field may be set to "0" to indicate deactivation of a semi-persistent PUSCH resource in an LAA secondary cell.

The terminal apparatus 1 clears a grant configured for a primary cell after first transmission of an SPS confirmation MAC control element for the primary cell triggered by release of Semi-Persistent Scheduling in the primary cell. The terminal apparatus 1 may clear a grant configured for an LAA secondary cell after first transmission of an SPS confirmation MAC control element for the LAA secondary cell triggered by release of Semi-Persistent Scheduling in the LAA secondary cell.

The SPS confirmation MAC control element for a primary cell is also referred to as a first SPS confirmation MAC control element. The SPS confirmation MAC control element for an LAA secondary cell is also referred to as a second SPS confirmation MAC control element.

A C0 field included in the second SPS confirmation MAC control element may indicate that a semi-persistent PUSCH resource in a primary cell is activated or deactivated. A C0 field included in the second SPS confirmation MAC control element may indicate that SPS confirmation for a primary cell may be indicated.

In a case that SPS confirmation for a primary cell is triggered and is not canceled, the terminal apparatus 1 has uplink resources to be allocated for initial transmission in this subframe, and the parameter skipUplinkTxLaaSPS is not configured for an LAA secondary cell, the terminal apparatus 1 may indicate to the first entity to generate a first SPS confirmation MAC control element, and cancel the SPS confirmation triggered for the primary cell.

In a case that SPS confirmation for a primary cell is triggered and is not canceled, the terminal apparatus 1 has uplink resources to be allocated for initial transmission in this subframe, and the parameter skipUplinkTxLaaSPS for an LAA secondary cell is configured, the terminal apparatus 1 may indicate to the first entity to generate a second SPS confirmation MAC control element, and cancel the SPS confirmation triggered for the primary cell and the LAA secondary cell.

In this case, the first SPS confirmation MAC control element and the second SPS confirmation MAC control element may correspond to the same first LCID. In other words, the size of the SPS confirmation MAC control element corresponding to the first LCID may be provided based on whether the parameter skipUplinkTxLaaSPS for an LAA secondary cell is configured. In a case that the parameter skipUplinkTxLaaSPS for an LAA secondary cell is not configured, the size of the SPS confirmation MAC control element corresponding to the first LCID may be zero bits. In a case that the parameter skipUplinkTxLaaSPS for an LAA secondary cell is configured, the size of the SPS confirmation MAC control element corresponding to the first LCID may be more than zero bits.

Figure 14:
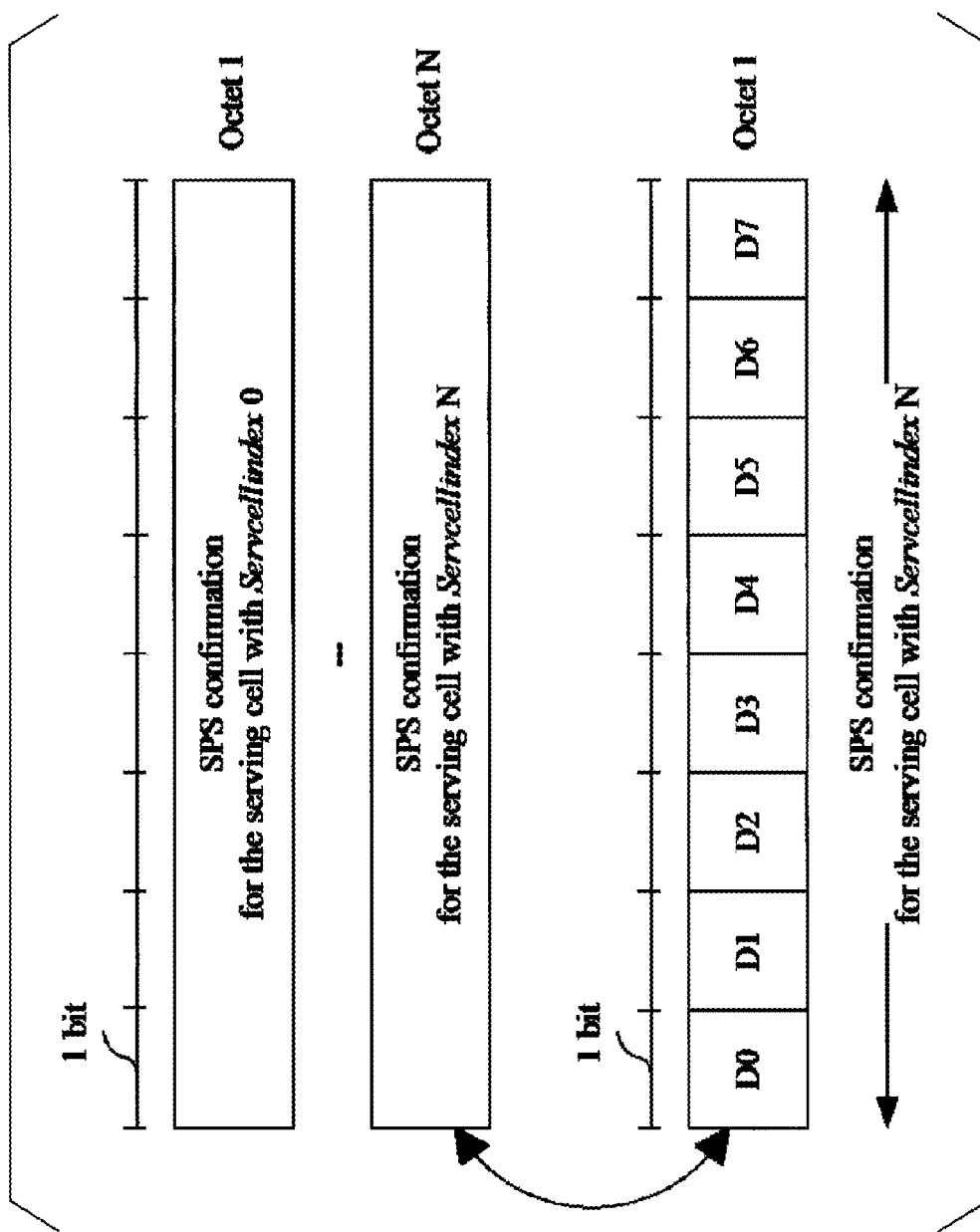
FIG. 14 is a diagram illustrating another example of a second SPS confirmation MAC control element corresponding to a serving cell according to the present embodiment.

FIG. 14 is a diagram illustrating another example of the second SPS confirmation MAC control element corresponding to serving cells according to the present embodiment. In FIG. 14, the second SPS confirmation MAC control element corresponding to serving cells includes multiple SPS confirmations corresponding to the serving cells. One SPS confirmation corresponds to one serving cell. One SPS confirmation includes multiple Di fields. One Di field may indicate SPS confirmation for a semi-persistent PUSCH resource associated with one SPS index in one serving cell. The Di field may indicate that a semi-persistent PUSCH resource associated with the SPS index SPSIdi in a serving cell is activated or deactivated.

The Di field may be set to '1' to indicate that a semi-persistent PUSCH resource associated with the SPS index SPSIdi in a serving cell is activated. The Di field may be set to '0' to indicate that a semi-persistent PUSCH resource associated with the SPS index SPSIdi in a serving cell is deactivated.

As described above, the terminal apparatus 1 may semi-permanently (semi-persistently or periodically) perform the transmission on the PUSCH (transmission on the UL-SCH) in the subframe specified based on Equation 1. In a case that the parameter skipUplinkTxSPS is not configured, the terminal apparatus 1 may clear the configured grant, based on the parameter implicitReleaseAfter configured by the base station apparatus 3 (parameter for indicating the number of empty transmissions before release).

For example, in a case that the parameter skipUplinkTxSPS is not configured, and the number of consecutive empty transmissions corresponding to the initial transmission on the semi-persistent PUSCH reaches a value indicated by using the parameter implicitReleaseAfter (the number of transmissions), the terminal apparatus 1 may clear the configured grant.

To be more specific, in a case that the parameter skipUplinkTxSPS is not configured, the terminal apparatus 1 may clear the configured grant immediately after the parameter implicitReleaseAfter corresponding to the number of consecutive new MAC protocol data units each containing no MAC service data units (i.e., containing zero MAC service data units) (may clear the configured grant immediately after the third parameter number of consecutive new MAC PDUs each containing zero MAC SDUs). Here, the number of the consecutive empty transmissions corresponding to the initial transmission includes the number of empty transmissions on the Semi-Persistent Scheduling resource. Here, the number of the consecutive empty transmissions corresponding to the initial transmission does not include the number of empty transmissions on the dynamically scheduled PUSCH resource.

Here, in a case that the parameter skipUplinkTxSPS is not configured, the terminal apparatus 1 may release (clear) an uplink resource (Semi-Persistent Scheduling resource, PUSCH resource) allocated by the base station apparatus 3, based on the parameter implicitReleaseAfter. To be more specific, in a case that the parameter skipUplinkTxSPS is not configured, the terminal apparatus 1 may release an uplink resource allocated by the base station apparatus 3, based on the parameter implicitReleaseAfter, in a similar manner to clearing the configured grant. Here, in a case that the parameter skipUplinkTxSPS is not configured, the terminal apparatus 1 may clear the configured grant and/or release the uplink resource in a case that the terminal apparatus 1 receives the DCI used to indicate release of Semi-Persistent Scheduling described above.

Figure 15:
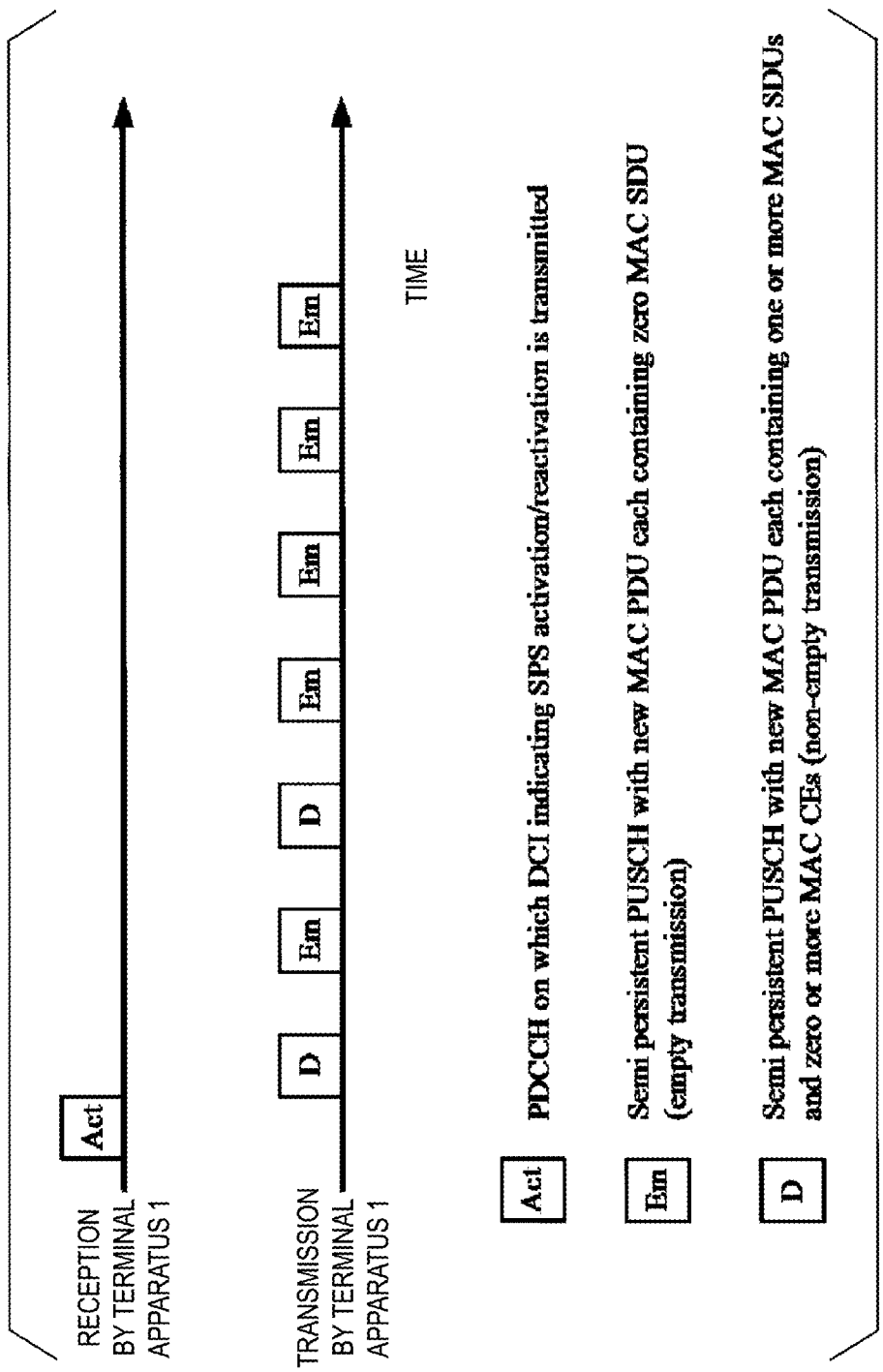
FIG. 15 is a diagram for illustrating a method of clearing a configured grant according to the present embodiment.

FIG. 15 is a diagram for illustrating a method of clearing the configured grant according to the present embodiment.

As illustrated in FIG. 15, the terminal apparatus 1 may receive the DCI which is used to indicate the activation and/or reactivation of the Semi-Persistent Scheduling. The terminal apparatus 1 may perform the non-empty transmission on the Semi-Persistent Scheduling resource. To be more specific, the terminal apparatus 1 may perform the non-empty transmission based on the configured uplink grant, according to Equation 1 described above. The terminal apparatus 1 may perform the empty transmission on the Semi-Persistent Scheduling resource. To be more specific, in a case that the terminal apparatus 1 does not have available data for transmission, the terminal apparatus 1 may perform the empty transmission on the Semi-Persistent Scheduling resource.

Here, the terminal apparatus 1 may clear the configured grant in a case that the number of consecutive empty transmissions on the Semi-Persistent Scheduling resource reaches the value configured by using the parameter implicitReleaseAfter (the number of transmissions). The terminal apparatus 1 may release the uplink resource (Semi-Persistent Scheduling resource) in a case that the number of consecutive empty transmissions in the Semi-Persistent Scheduling resource reaches the value configured by using the parameter implicitReleaseAfter (the number of transmissions). To be more specific, the terminal apparatus 1 may clear the configured grant and/or release the uplink resource, based on the parameter implicitReleaseAfter.

In a case that the HARQ parameter is changed, the terminal apparatus 1 may clear the configured grant. For example, in a case that the HARQ parameter is previously released and information for indicating configuration of the HARQ parameter is received, the terminal apparatus 1 may clear the configured grant. For example, in a case that the HARQ parameter is not previously configured and information for indicating configuration of the HARQ parameter is received, the terminal apparatus 1 may clear the configured grant. For example, in a case that the HARQ parameter is previously configured and information for indicating release of the HARQ parameter is received, the terminal apparatus 1 may clear the configured grant.

In a case that the HARQ parameter is changed, RRC of the terminal apparatus 1 may indicate to the MAC entity to perform partial reset. For example, in a case that the HARQ parameter is not released or not configured previously and information for indicating configuration of the HARQ parameter is received, RRC of the terminal apparatus 1 may indicate to the MAC entity to perform partial reset. For example, in a case that the HARQ parameter is previously configured and information for indicating release of the HARQ parameter is received, RRC of the terminal apparatus 1 may indicate to the MAC entity to perform partial reset. In a case that the MAC entity is requested to perform partial reset of the MAC entity for a serving cell by the higher layer (RRC), the MAC entity clears a grant configured for the serving cell.

A method in which the HARQ entity identifies a HARQ process associated with a subframe will be described below. The HARQ entity delivers an uplink grant to the identified HARQ process.

In the synchronous HARQ, the HARQ entity identifies a HARQ process associated with a subframe without using information received from the base station apparatus 3. In the synchronous HARQ, a HARQ process may be identified based on a subframe associated with an uplink grant. For example, in an FDD serving cell, multiple subframes $\{n+8 \cdot i\}$ are associated with the same HARQ process. Here, each of n and i is an integer. Here, the multiple subframes $\{n+8 \cdot i\}$ include subframe n, subframe n+8, and subframe n+16, for example.

In the asynchronous HARQ, a HARQ process number may be identified by using an uplink grant included in the PDCCH. Here, the uplink grant included in the PDCCH may include information of a HARQ process number. In the asynchronous HARQ, in a case that the uplink grant does not include information of a HARQ process number, the HARQ process number may be fixed (e.g., 0).

In the asynchronous HARQ, for the configured grant, the HARQ process number associated with a subframe in which the configured grant is generated may be identified based on at least an SFN and a subframe transmitted on the PUSCH. In the asynchronous HARQ, for the configured grant, the HARQ process number associated with a subframe in which the configured grant is generated may be provided based on the following Equation 2.

$$HARQ \text{ Process number/ID} = \qquad \text{Equation 2}$$
$$[\text{floor}(CURRENT\_TTI/semiPersistSchedIntervalUL)]$$
$$\text{modulo } numberOfConfUlSPS\text{-}Processes,$$
$$\text{where } CURRENT\_TTI = [(SFN * 10) + \text{subframe}].$$

Here, in Equation 2, SFN and subframe represent the SFN and subframe, respectively, transmitted on the PUSCH. semiPersistSchedIntervalUL is the parameter described above. The base station apparatus 3 may transmit the parameter numberOfConfUlSPS-Processes to the terminal apparatus 1. For example, the base station apparatus 3 may transmit the parameter numberOfConfUlSPS-Processes by using higher layer signaling (e.g., RRC layer signaling). The parameter numberOfConfUlSPS-Processes indicates the number of HARQ processes configured for uplink Semi-Persistent Scheduling.

Adaptive HARQ retransmission and non-adaptive HARQ retransmission will be described below. The adaptive HARQ retransmission is also referred to as adaptive retransmission. The non-adaptive HARQ retransmission is also referred to as non-adaptive retransmission.

The adaptive retransmission is a retransmission performed based on a PDCCH (uplink grant) received from the base station apparatus 3. The non-adaptive retransmission is a retransmission performed based on an uplink grant previously used by the HARQ process.

In a case that a PDCCH including an uplink grant for indicating retransmission is received for the synchronous HARQ after initial transmission, the terminal apparatus 1 may perform adaptive retransmission, irrespective of a HARQ feedback received by using a PHICH.

In a case that a PDCCH including an uplink grant is not received for the synchronous HARQ after initial transmission, and a HARQ feedback received by using a PHICH indicates a NACK, the terminal apparatus 1 may perform non-adaptive retransmission. Here, the initial transmission may be an initial transmission based on a configured uplink grant.

In a case that a PDCCH including an uplink grant is not received for the synchronous HARQ after initial transmission, and a HARQ feedback received by using a PHICH indicates an ACK, the terminal apparatus 1 does not perform HARQ transmission (initial transmission, retransmission), and retains contents (data) of a HARQ buffer.

For the synchronous HARQ, the HARQ entity may determine whether to indicate to an identified HARQ process to generate non-adaptive retransmission, based on at least a part or all of the following Element A to Element D.

Element A: Whether an uplink grant is a configured grant
Element B: Whether the parameter semiPersistSchedIntervalUL shorter than 10 subframes is configured for the MAC entity
Element C: Whether a HARQ buffer of an identified HARQ process is empty
Element D: Whether a state variable HARQ_FEEDBACK of an identified HARQ process is a NACK For example, in a case that the following Condition A to Condition D are satisfied for the synchronous HARQ, the HARQ entity may indicate to an identified HARQ process to generate non-adaptive retransmission.

Condition A: An uplink grant is a configured grant

Condition B: The parameter semiPersistSchedIntervalUL shorter than 10 subframes is configured for the MAC entity Condition C: A HARQ buffer of an identified HARQ process is not empty Condition D: The state variable HARQ_FEEDBACK of an identified HARQ process is a NACK A state that an uplink grant is a configured grant may be substituted by a state of being Semi-Persistent Scheduling, or a state that an uplink grant corresponds to an SPS C-RNTI. A state that an uplink grant is not a configured grant may be substituted by a state that an uplink grant is an uplink grant included in a PDCCH, or a state that an uplink grant corresponds to a C-RNTI.

In a case that an uplink grant is a configured grant, the terminal apparatus 1 considers that NDI bits corresponding to the HARQ process have been toggled. To be more specific, the condition that an uplink grant is a configured grant may include a condition that NDI bits corresponding to the HARQ process have been toggled.

In a case that the HARQ entity requests the HARQ process to perform initial transmission or adaptive retransmission, the HARQ process sets the state variable HARQ_FEEDBACK to a NACK. In a case that a HARQ feedback for a transport block is received, the HARQ process sets the state variable HARQ_FEEDBACK to the received value (ACK, NACK).

In a case that the parameter semiPersistSchedIntervalUL shorter than 10 subframes is configured, the parameter skipUplinkTxSPS may be invariably configured. To be more specific, a case that the parameter semiPersistSchedIntervalUL shorter than 10 subframes is configured may be a case that the parameter semiPersistSchedIntervalUL shorter than 10 subframes and the parameter skipUplinkTxSPS are configured.

In a case that Condition A is satisfied and any one of Condition B to Condition D is not satisfied for the synchronous HARQ, the HARQ entity may indicate to an identified HARQ process to trigger initial transmission.

In a case that Condition A is satisfied for the synchronous HARQ, the HARQ entity may indicate to an identified HARQ process to perform initial transmission or non-adaptive retransmission, based on whether Condition B to Condition D are satisfied.

The HARQ entity may determine whether to indicate to an identified HARQ process to generate non-adaptive retransmission, based on at least a part or all of the following Element A to Element E for the asynchronous HARQ.

Element A: Whether an uplink grant is a configured grant

Element B: Whether the parameter semiPersistSchedIntervalUL shorter than 10 subframes is configured for the MAC entity Element C: Whether a HARQ buffer of an identified HARQ process is empty Element D: Whether the state variable HARQ_FEEDBACK of an identified HARQ process is a NACK Element E: Whether the parameter skipUplinkTxSPS is configured for the MAC entity For example, in a case that the following Condition A and Condition E are satisfied for the asynchronous HARQ, the HARQ entity may indicate to an identified HARQ process to generate non-adaptive retransmission.

Condition A: An uplink grant is a configured grant

Condition E: The parameter skipUplinkTxSPS is configured for the MAC entity

In Condition E, the length of the parameter semiPersistSchedIntervalUL may be longer or shorter than 10 subframes. To be more specific, in Condition E, the length of the parameter semiPersistSchedIntervalUL may not be concerned.

In a case that Condition A is satisfied and Condition E is not satisfied for the asynchronous HARQ, the HARQ entity may indicate to an identified HARQ process to trigger initial transmission.

In a case that Condition A is satisfied for the asynchronous HARQ, the HARQ entity may indicate to an identified HARQ process to perform initial transmission or non-adaptive retransmission, based on whether Condition E is satisfied.

A HARQ feedback for the uplink transmission is transmitted by using the PHICH. Here, the uplink transmission may be PUSCH transmission or transport block transmission. For the synchronous HARQ, the HARQ feedback for the uplink transmission may be transmitted by using the PHICH. For the asynchronous HARQ, the HARQ feedback for the uplink transmission may be not transmitted.

In the HARQ entity, whether a HARQ feedback for the uplink transmission is transmitted may be determined based on at least a part or all of the following Element A to Element E for the asynchronous HARQ. Here, whether a HARQ feedback for the uplink transmission is transmitted may be whether a HARQ feedback for the uplink transmission is received.

Element A: Whether an uplink grant is a configured grant

Element B: Whether the parameter semiPersistSchedIntervalUL shorter than 10 subframes is configured for the MAC entity Element C: Whether a HARQ buffer of an identified HARQ process is empty Element D: Whether the state variable HARQ_FEEDBACK of an identified HARQ process is a NACK Element E: Whether the parameter skipUplinkTxSPS is configured for the MAC entity For example, in a case that the following Condition A and Condition E are satisfied for the asynchronous HARQ, a HARQ feedback for the uplink transmission may be transmitted.

Condition A: An uplink grant is a configured grant

Condition E: The parameter skipUplinkTxSPS is configured for the MAC entity

In a case that Condition A is satisfied and Condition E is not satisfied for the asynchronous HARQ, a HARQ feedback for the uplink transmission may not be transmitted.

In a case that Condition A is satisfied for the asynchronous HARQ, in the HARQ entity, whether a HARQ feedback for the uplink transmission is transmitted may be determined based on whether Condition E is satisfied.

In a case that uplink HARQ operation is the asynchronous HARQ and the uplink grant corresponds to a C-RNTI, a HARQ feedback for the uplink transmission may not be transmitted.

In a case that the terminal apparatus 1 receives a NACK in subframe n, the terminal apparatus 1 may perform PUSCH transmission (non-adaptive retransmission) in subframe n+p. In a case that the terminal apparatus 1 does not receive an ACK in subframe n, the terminal apparatus 1 may perform PUSCH transmission (non-adaptive retransmission) in subframe n+p.

In a case that the HARQ entity indicates to the HARQ process to perform non-adaptive retransmission, uplink HARQ operation is the synchronous HARQ, and the state variable HARQ_FEEDBACK is configured to an ACK, the HARQ process may not generate transmission (non-adaptive retransmission).

In a case that the HARQ entity indicates to the HARQ process to perform non-adaptive retransmission, uplink HARQ operation is the synchronous HARQ, and the state variable HARQ_FEEDBACK is configured to a NACK, the HARQ process may generate transmission (non-adaptive retransmission).

In a case that the HARQ entity indicates to the HARQ process to perform non-adaptive retransmission, uplink HARQ operation is the asynchronous HARQ, and the state variable HARQ_FEEDBACK is configured to an ACK, the HARQ process may not generate transmission (non-adaptive retransmission).

In a case that the HARQ entity indicates to the HARQ process to perform non-adaptive retransmission, uplink HARQ operation is the asynchronous HARQ, and the state variable HARQ_FEEDBACK is configured to a NACK, the HARQ process may generate transmission (non-adaptive retransmission).

In a case that uplink HARQ operation is the asynchronous HARQ and the uplink grant corresponds to a C-RNTI, the non-adaptive retransmission may not be performed.

The base station apparatus 3 may indicate to the terminal apparatus 1 to deactivate non-adaptive transmission of a transport block initially transmitted on a semi-persistent PUSCH, by using an uplink DCI format (e.g., DCI format 0, DCI format OD).

For example, in a case that CRC parity bits added to the DCI format are scrambled with the SPS C-RNTI, and a field of information of a New data indicator (NDI) included within the DCI format is set to '0', the terminal apparatus 1 may verify (confirm, or check) whether multiple information fields included within the DCI format are set to specific values. To be more specific, the CRC parity bits added to the DCI format scrambled with the SPS C-RNTI and the field of the information of the NDI may be used for validation of the Semi-Persistent Scheduling.

Here, in a case that the verification is successful, the terminal apparatus 1 may consider (or may recognize) that a received DCI format provides a valid indication of deactivation of non-adaptive transmission of a transport block initially transmitted on a semi-persistent PUSCH. In a case that the verification is not successful, the terminal apparatus 1 may discard (clear) this DCI format.

To be more specific, the DCI format may be used to indicate deactivation of non-adaptive transmission of a transport block initially transmitted on a semi-persistent PUSCH.

FIG. 16 is a diagram illustrating an example of special fields for deactivation of non-adaptive transmission of a transport block initially transmitted on a semi-persistent PUSCH according to the present embodiment. As illustrated in FIG. 16, multiple fields may be defined for deactivation of non-adaptive transmission of a transport block initially transmitted on a semi-persistent PUSCH. For deactivation of non-adaptive transmission of a transport block initially transmitted on a semi-persistent PUSCH, a predetermined value (that may be a specific value) set in each of the multiple fields may be defined.

As illustrated in FIG. 16, for example, in a case that the uplink DCI format (e.g., DCI format 0, DCI format OD) is used for deactivation of non-adaptive transmission of a transport block initially transmitted on a semi-persistent PUSCH, a field of information of a TPC command for a scheduled PUSCH may be set to '11', a field of information of a Cyclic shift DMRS may be set to '111', a field of information of a Modulation and coding scheme (MCS) and a redundancy version may be set to '11111', and a field of information of Resource block assignment and hopping resource allocation may be set to all '1', which are included within the uplink DCI format.

One DCI format used to deactivate non-adaptive transmission of a transport block initially transmitted on a semi-persistent PUSCH may correspond to one HARQ process.

In a case of DCI format OD including information of a HARQ process number, a HARQ process associated with DCI format OD used to deactivate non-adaptive transmission of a transport block initially transmitted on a semi-persistent PUSCH may be provided based on the information of the HARQ process number.

In a case of DCI format 0 not including information of a HARQ process number, a HARQ process associated with DCI format 0 used to deactivate non-adaptive transmission of a transport block initially transmitted on a semi-persistent PUSCH may be provided based on at least a subframe in which the DCI format 0 is received.

In a case that verification of deactivation of non-adaptive transmission of a transport block initially transmitted on a semi-persistent PUSCH is successful, the terminal apparatus 1 may deliver an ACK to the MAC entity, and the MAC entity may set an ACK to the state variable HARQ_FEEDBACK of an identified HARQ process. To be more specific, indication of deactivation of non-adaptive transmission of a transport block initially transmitted on a semi-persistent PUSCH may be a response to the transport block initially transmitted on the semi-persistent PUSCH.

The terminal apparatus 1 (HARQ process) may perform non-adaptive retransmission of a transport block until the terminal apparatus 1 (HARQ process) detects a response to the transport block initially transmitted on a semi-persistent PUSCH. Here, the response may be a DCI format indicating a response to a transport block initially transmitted on a semi-persistent PUSCH, or a HARQ feedback indicating an ACK.

The terminal apparatus 1 (HARQ process) may perform initial transmission, based on the configured grant, after the terminal apparatus 1 (HARQ process) detects a response to a transport block initially transmitted on a semi-persistent PUSCH.

Operation of flushing of the HARQ buffer will be described. A maximum number of transmissions may be configured for the synchronous HARQ. The maximum number of transmissions may be a maximum number of retransmissions. A parameter maxHARQ-Tx indicates the maximum number of transmissions. The base station apparatus 3 may transmit the parameter maxHARQ-Tx to the terminal apparatus 1. For example, the base station apparatus 3 may transmit the parameter maxHARQ-Tx by using higher layer signaling (e.g., RRC layer signaling). In a case that the HARQ entity requests the HARQ process to perform initial transmission and uplink HARQ operation is the synchronous HARQ, the HARQ process may set a state variable CURRENT_TX_NB to 0. In a case that the HARQ entity requests the HARQ process to perform retransmission (adaptive retransmission, non-adaptive retransmission) and uplink HARQ operation is the synchronous HARQ, the HARQ process may increment the state variable CURRENT_TX_NB by 1. In a case that uplink HARQ operation is the synchronous HARQ and the state variable CURRENT_TX_NB is a predetermined value, the HARQ process may flush the HARQ buffer. Here, the predetermined value may be a value smaller than the maximum number of transmissions by 1.

In a case that uplink HARQ operation is the asynchronous HARQ, the terminal apparatus 1 (HARQ process, HARQ entity) may determine whether to apply operation of flushing of the HARQ buffer, based on at least a part of all of the following Element A2 to Element E.

Element A2: Whether an uplink grant associated with initial transmission is a configured grant Element B: Whether the parameter semiPersistSchedIntervalUL shorter than 10 subframes is configured for the MAC entity Element C: Whether a HARQ buffer of an identified HARQ process is empty Element D: Whether the state variable HARQ_FEEDBACK of an identified HARQ process is a NACK Element E: Whether the parameter skipUplinkTxSPS is configured for the MAC entity For example, in a case that uplink HARQ operation is the asynchronous HARQ, and in a case that the following Condition A2 and Condition E are satisfied, the HARQ entity may indicate to an identified HARQ process to generate non-adaptive retransmission.

Condition A2: Whether an uplink grant associated with initial transmission is a configured grant Condition E: The parameter skipUplinkTxSPS is configured for the MAC entity A state that an uplink grant associated with initial transmission is a configured grant may be substituted by a state of being Semi-Persistent Scheduling.

In a case that uplink HARQ operation is the asynchronous HARQ and Condition A2 is not satisfied, operation of flushing of the HARQ buffer may not apply.

In a case that uplink HARQ operation is the asynchronous HARQ, Condition A2 is satisfied, and Condition E is not satisfied, operation of flushing of the HARQ buffer may not apply.

In a case that uplink HARQ operation is the asynchronous HARQ and Condition A is satisfied, the HARQ entity may indicate to an identified HARQ process to perform initial transmission or non-adaptive retransmission, based on whether Condition E is satisfied.

In a case that uplink HARQ operation is the asynchronous HARQ and the state variable CURRENT_TX_NB is a predetermined value, the HARQ process may not flush the HARQ buffer, may not perform non-adaptive retransmission, and may retain contents (data) of the HARQ buffer. In a case that uplink HARQ operation is the asynchronous HARQ and the state variable CURRENT_TX_NB is equal to or larger than a predetermined value, adaptive retransmission may apply. Here, the predetermined value may be a value smaller than the maximum number of transmissions by 1.

Figure 17:
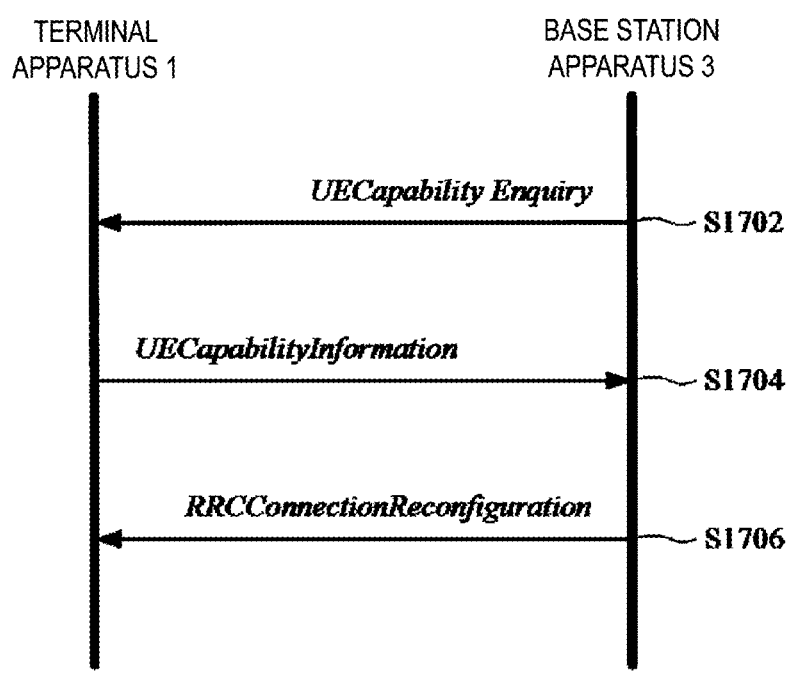
FIG. 17 is a diagram illustrating an example of a method of obtaining the parameter skipUplinkTxSPS, the parameter skipUplinkTxLaaSPS, and the parameter skipUplinkTxDynamic according to the present embodiment.

FIG. 17 is a diagram illustrating an example of a method of obtaining the parameter skipUplinkTxSPS, the parameter skipUplinkTxLaaSPS, and the parameter skipUplinkTxDynamic according to the present embodiment.

In Step S1702, the base station apparatus 3 transmits, to the terminal apparatus 1, information UECapabilityEnquiry that is used to request transmission of capability information UECapabilityInformation of the terminal apparatus 1.

In Step S1704, the terminal apparatus 1 transmits, to the base station apparatus 3, the capability information UECapabilityInformation of the terminal apparatus 1, in response to the information UECapabilityEnquiry.

In Step S1706, the base station apparatus 3 generates information RRCConnectionReconfiguration for modifying an RRC connection, in response to the received capability information UECapabilityInformation. Then, the base station apparatus 3 transmits the generated information RRCConnectionReconfiguration to the terminal apparatus 1. Here, the information RRCConnectionReconfiguration may include at least a part or all of the parameter skipUplinkTxSPS, the parameter skipUplinkTxLaaSPS, and the parameter skipUplinkTxDynamic. The base station apparatus 3 may determine whether to include a part or all of the parameter skipUplinkTxSPS, the parameter skipUplinkTxLaaSPS, and the parameter skipUplinkTxDynamic in the information RRCConnectionReconfiguration, depending on the received capability information UECapabilityInformation. The information RRCConnectionReconfiguration is transmitted by using a Dedicated Control CHannel (DCCH). The DCCH is a point-to-point bidirectional logical channel on which dedicated control information between the base station apparatus 3 (network) and the terminal apparatus 1 is transmitted.

The capability information UECapabilityInformation transmitted in Step S1704 may include at least a part or all of the following capability parameters of (i) to (vi).

Figure 18:
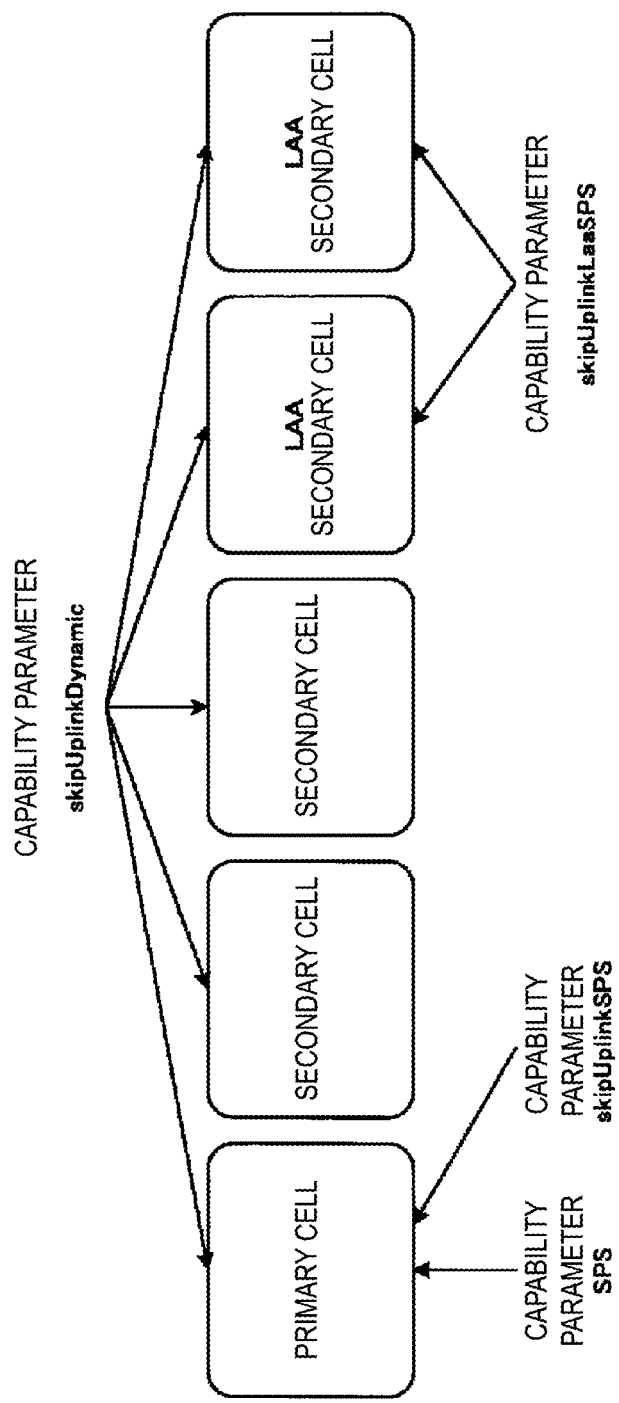
FIG. 18 is a diagram illustrating a correspondence between capability parameters and serving cells according to the present embodiment.
Figure 19:
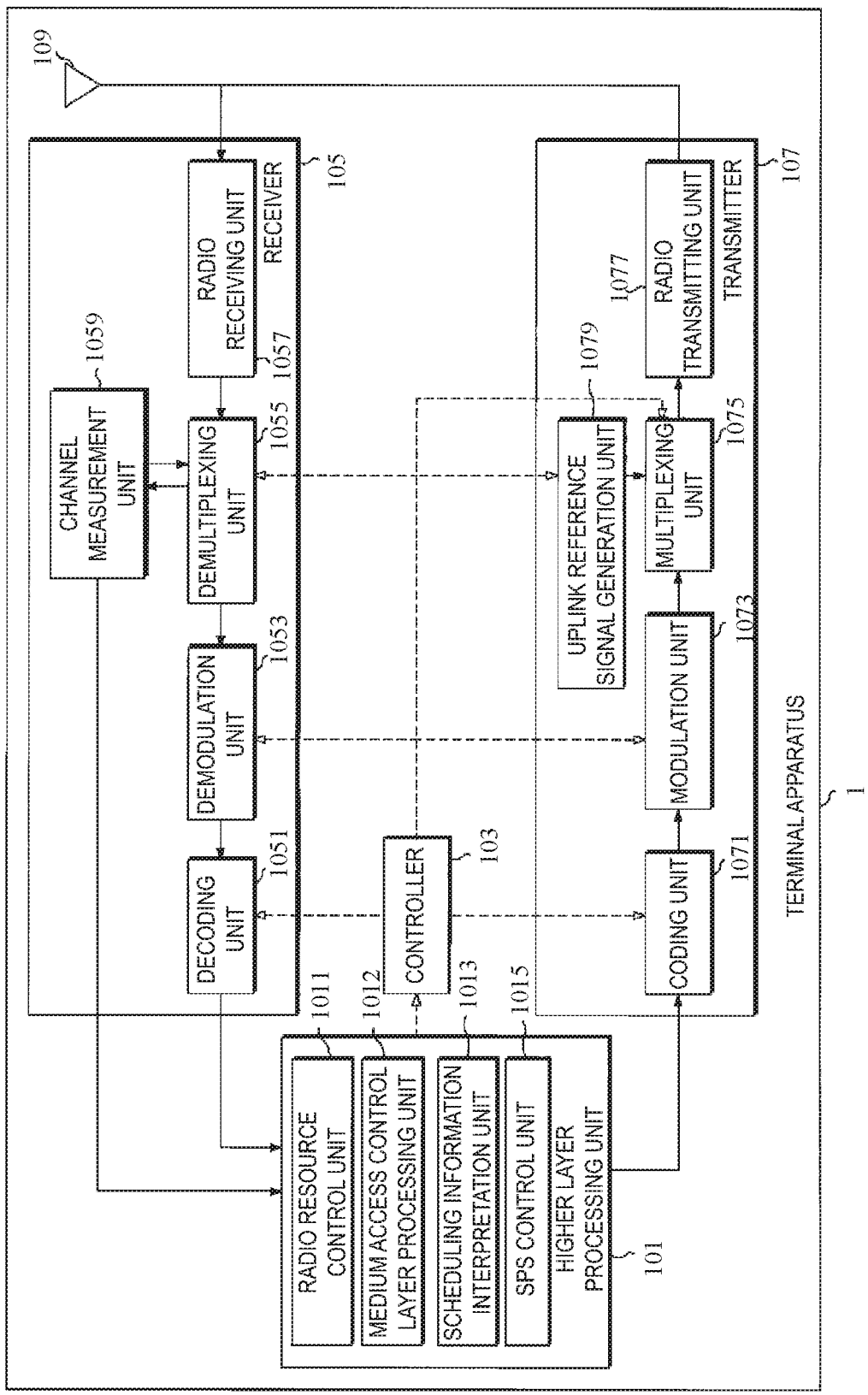
FIG. 19 is a schematic block diagram illustrating a configuration of a terminal apparatus 1 according to the present embodiment.
Figure 20:
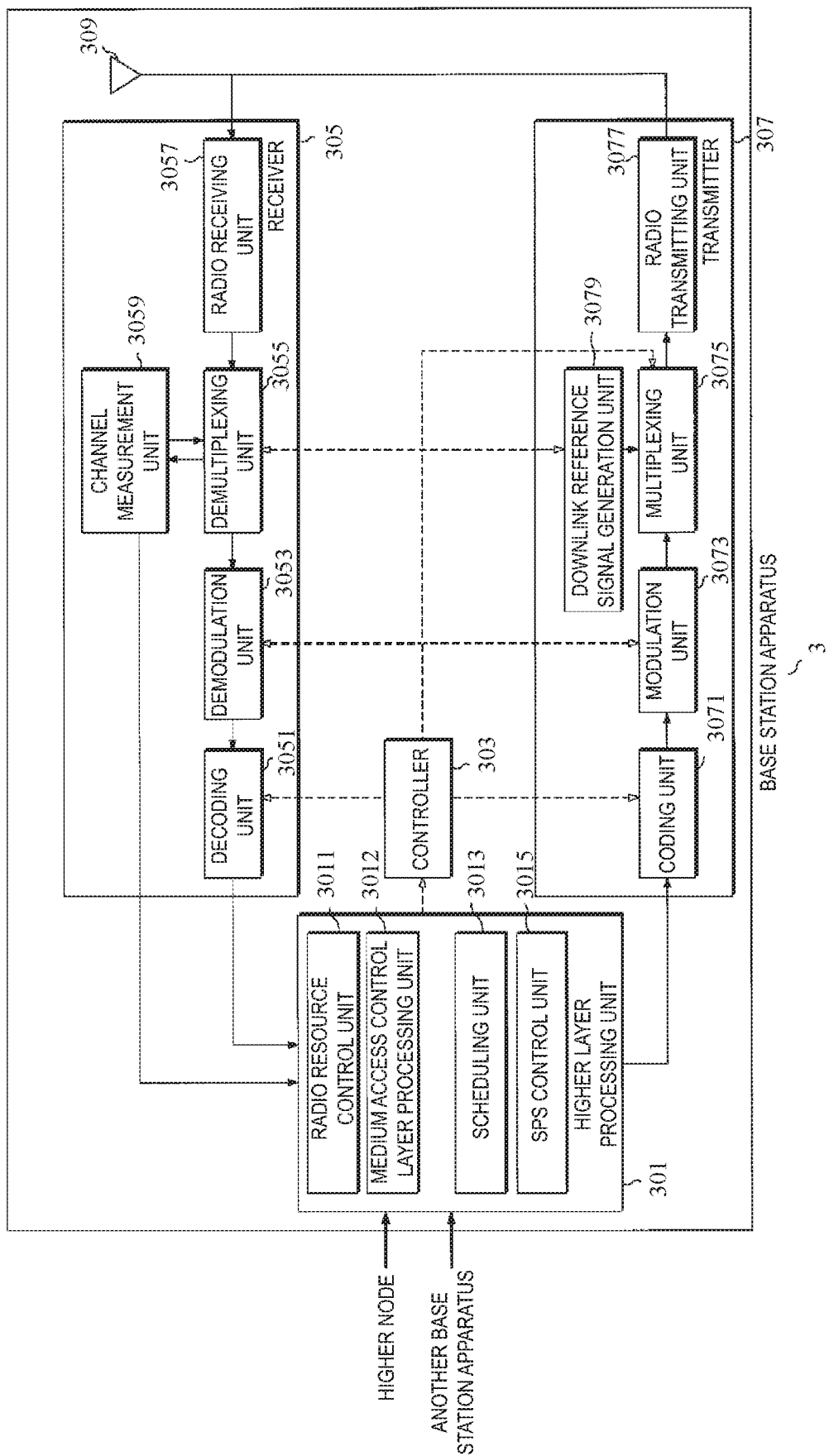
FIG. 20 is a schematic block diagram illustrating a configuration of a base station apparatus 3 according to the present embodiment.

(i) Capability parameter SPS
(ii) Capability parameter skipUplinkSPS
(iii) Capability parameter skipUplinkLaaSPS
(iv) Capability parameter skipUplinkDynamic
(v) Capability parameter crossCarrierSchedulingLAA-DL
(vi) Capability parameter crossCarrierSchedulingLAA-UL FIG. 18 is a diagram illustrating a correspondence between the capability parameters and serving cells according to the present embodiment. The capability parameter SPS and the capability parameter skipUplinkSPS are associated with a primary cell. The capability parameter skipUplinkLaaSPS is associated with multiple LAA secondary cells. The capability parameter skipUplinkLaaSPS, the capability parameter crossCarrierSchedulingLAA-DL, and the capability parameter crossCarrierSchedulingLAA-UL may be associated with all of the LAA secondary cells configured for the terminal apparatus 1. The capability parameter skipUplinkDynamic is associated with multiple serving cells. The capability parameter skipUplinkDynamic may be associated with all of the serving cells configured for the terminal apparatus 1.

The capability parameter SPS may indicate that the terminal apparatus 1 supports Semi-Persistent Scheduling in a primary cell. To be more specific, the capability information UECapabilityInformation may indicate whether the terminal apparatus 1 supports Semi-Persistent Scheduling in a primary cell.

The capability parameter skipUplinkSPS may indicate whether the terminal apparatus 1 supports skipping of uplink transmission corresponding to a grant configured for a primary cell in a case that there is no available data for transmission in a buffer of the terminal apparatus 1.

The capability parameter skipUplinkLaaSPS may indicate (i) whether the terminal apparatus 1 supports Semi-Persistent Scheduling in an LAA secondary cell, and (ii) whether the terminal apparatus 1 supports skipping of uplink transmission corresponding to a grant configured for an LAA secondary cell in a case that there is no available data for transmission in a buffer of the terminal apparatus 1. The capability parameter skipUplinkLaaSPS may indicate that (i) the terminal apparatus 1 supports Semi-Persistent Scheduling in an LAA secondary cell, and (ii) the terminal apparatus 1 supports skipping of uplink transmission corresponding to a grant configured for an LAA secondary cell in a case that there is no available data for transmission in a buffer of the terminal apparatus 1. The capability parameter skipUplinkLaaSPS may indicate that (i) the terminal apparatus 1 does not support Semi-Persistent Scheduling in an LAA secondary cell, and (ii) the terminal apparatus 1 does not support skipping of uplink transmission corresponding to a grant configured for an LAA secondary cell in a case that there is no available data for transmission in a buffer of the terminal apparatus 1. To be more specific, the capability parameter skipUplinkLaaSPS cannot indicate that the terminal apparatus 1 supports only one of (i) Semi-Persistent Scheduling in an LAA secondary cell, and (ii) skipping of uplink transmission corresponding to a grant configured for an LAA secondary cell in a case that there is no available data for transmission in a buffer of the terminal apparatus 1.

The capability parameter skipUplinkDynamic may indicate whether the terminal apparatus 1 supports skipping of uplink transmission corresponding to an uplink grant corresponding to a C-RNTI in a case that there is no available data for transmission in a buffer of the terminal apparatus 1.

The capability parameter crossCarrierSchedulingLAA-DL may indicate whether the terminal apparatus 1 supports cross carrier scheduling from a primary cell and a secondary cell in a downlink of an LAA secondary cell. To be more specific, the capability parameter crossCarrierScheduling-LAA-DL may indicate whether the terminal apparatus 1 supports reception of a PDCCH including downlink assignment for scheduling an LAA secondary cell, in a primary cell or a secondary cell.

The capability parameter crossCarrierSchedulingLAA-UL may indicate whether the terminal apparatus 1 supports cross carrier scheduling from a primary cell and a secondary cell in an uplink of an LAA secondary cell. To be more specific, the capability parameter crossCarrierScheduling-LAA-UL may indicate whether the terminal apparatus 1 supports reception of a PDCCH including an uplink grant for scheduling an LAA secondary cell, in a primary cell or a secondary cell. To be more specific, the capability parameter crossCarrierSchedulingLAA-UL may indicate whether the terminal apparatus 1 supports reception of a PDCCH including a DCI format for activating or releasing a semi-persistent PUSCH resource in an LAA secondary cell, in a primary cell or a secondary cell.

Only in a case that the capability parameter crossCarrierSchedulingLAA-UL indicates that the terminal apparatus 1 supports cross carrier scheduling from a primary cell and a secondary cell in an uplink of an LAA secondary cell, the capability parameter skipUplinkLaaSPS may indicate that (i) the terminal apparatus 1 supports SPS in the LAA secondary cell, and (ii) the terminal apparatus 1 supports skipping of uplink transmission corresponding to a grant configured for the LAA secondary cell in a case that there is no available data for transmission in a buffer of the terminal apparatus 1. Only in a case that the terminal apparatus 1 is configured to monitor a PDCCH including an uplink grant for an LAA secondary cell in a primary cell or a secondary cell, the parameter skipUplinkTxLaaSPS for the LAA secondary cell may be configured. In a case that the terminal apparatus 1 is not configured to monitor a PDCCH including an uplink grant for an LAA secondary cell in a primary cell or a secondary cell, the parameter skipUplinkTxLaaSPS for the LAA secondary cell may not be configured.

In a case that the terminal apparatus 1 is configured to monitor a PDCCH including an uplink grant for an LAA secondary cell in a primary cell or a secondary cell, the terminal apparatus 1 may receive a PDCCH including a DCI format for activating or releasing a semi-persistent PUSCH resource in the LAA secondary cell, in a primary cell or a secondary cell.

Even in a case that the terminal apparatus 1 is configured to monitor a PDCCH including an uplink grant for an LAA secondary cell in the LAA secondary cell, the terminal apparatus 1 may receive a PDCCH including a DCI format for releasing a semi-persistent PUSCH resource in the LAA secondary cell, in a primary cell or a secondary cell.

In a case that the terminal apparatus 1 is configured to monitor a PDCCH including an uplink grant for an LAA secondary cell in the LAA secondary cell, the terminal apparatus 1 may receive a PDCCH including a DCI format for activating a semi-persistent PUSCH resource in the LAA secondary cell, in the LAA secondary cell. Even in a case that the terminal apparatus 1 is configured to monitor a PDCCH including an uplink grant for an LAA secondary cell in the LAA secondary cell, the terminal apparatus 1 may receive a PDCCH including a DCI format for activating a semi-persistent PUSCH resource in the LAA secondary cell, in a primary cell or a secondary cell.

Configurations of apparatuses according to the present embodiment will be described below.

FIG. 8 is a schematic block diagram illustrating a configuration of the terminal apparatus 1 according to the present embodiment. As illustrated in the figure, the terminal apparatus 1 includes a higher layer processing unit 101, a controller 103, a receiver 105, a transmitter 107, and a transmit and/or receive antenna 109. The higher layer processing unit 101 includes a radio resource control unit 1011, a medium access control layer processing unit 1012, a scheduling information interpretation unit 1013, and an SPS control unit 1015. The receiver 105 includes a decoding unit 1051, a demodulation unit 1053, a demultiplexing unit 1055, a radio receiving unit 1057, and a channel measurement unit 1059. The transmitter 107 includes a coding unit 1071, a modulation unit 1073, a multiplexing unit 1075, a radio transmitting unit 1077, and an uplink reference signal generation unit 1079.

The higher layer processing unit 101 outputs, to the transmitter 107, the uplink data (the transport block) generated by a user operation or the like. The higher layer processing unit 101 performs processing of a Medium Access Control (MAC) layer, a Packet Data Convergence Protocol (PDCP) layer, a Radio Link Control (RLC) layer, and a Radio Resource Control (RRC) layer.

The radio resource control unit 1011 included in the higher layer processing unit 101 manages various configuration information/parameters of the terminal apparatus 1 itself. The radio resource control unit 1011 sets the various configuration information/parameters, based on higher layer signaling received from the base station apparatus 3. To be more specific, the radio resource control unit 1011 sets the various configuration information/parameters, based on the information for indicating the various configuration information/parameters received from the base station apparatus 3. The radio resource control unit 1011 generates information to be mapped to each uplink channel, and outputs the generated information to the transmitter 107. The radio resource control unit 1011 is also referred to as a configuration unit 1011.

The medium access control layer processing unit 1012 included in the higher layer processing unit 101 performs processing of the Medium Access Control (MAC) layer. The medium access control layer processing unit 1012 performs processing of the MAC entity, the HARQ entity, and the first entity.

Here, the scheduling information interpretation unit 1013 included in the higher layer processing unit 101 interprets the DCI format (scheduling information) received through the receiver 105, generates control information for control of the receiver 105 and the transmitter 107, based on a result of interpreting the DCI format, and outputs the generated control information to the controller 103.

The SPS control unit 1015 included in the higher layer processing unit 101 performs controls concerning the SPS, based on various configuration information, and information or conditions regarding the SPS such as parameters.

Based on the control information from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and/or receive antenna 109, and outputs, to the higher layer processing unit 101, the information resulting from the decoding.

The radio receiving unit 1057 converts (down converts) a downlink signal received through the transmit and/or receive antenna 109 into a baseband signal through orthogonal demodulation, removes unnecessary frequency components, controls an amplification level in such a manner as to suitably maintain a signal level, performs orthogonal demodulation, based on an in-phase component and an orthogonal component of the reception signal, and converts the resulting orthogonally-demodulated analog signal into a digital signal. The radio receiving unit 1057 removes a portion corresponding to a Cyclic Prefix (CP) from the digital signal resulting from the conversion, performs Fast Fourier Transform (FFT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. The demultiplexing unit 1055 makes a compensation of channels including the PHICH, the PDCCH, the EPDCCH, and the PDSCH, from a channel estimate input from the channel measurement unit 1059. The demultiplexing unit 1055 outputs, to the channel measurement unit 1059, the downlink reference signal resulting from the demultiplexing.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal apparatus 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs, to the higher layer processing unit 101, downlink control information resulting from the decoding and an RNTI to which the downlink control information corresponds.

The demodulation unit 1053 demodulates the PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data, based on information of a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. The channel measurement unit 1059 calculates a downlink channel estimate from the downlink reference signal and outputs the calculated downlink channel estimate to the demultiplexing unit 1055. The channel measurement unit 1059 performs channel measurement and/or interference measurement to calculate a CQI (or the CSI).

The transmitter 107 generates the uplink reference signal in accordance with the control signal input from the controller 103, codes and modulates the uplink data (the transport block) input from the higher layer processing unit 101, multiplexes the PUCCH, the PUSCH, and the generated uplink reference signal, and transmits a result of the multiplexing to the base station apparatus 3 through the transmit and/or receive antenna 109. The transmitter 107 transmits uplink control information.

The coding unit 1071 performs coding, such as convolutional coding or block coding, on the uplink control information input from the higher layer processing unit 101. The coding unit 1071 performs turbo coding, based on information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme determined in advance for each channel. Based on the information used for the scheduling of the PUSCH, the modulation unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs precoding on the sequences.

The uplink reference signal generation unit 1079 generates a sequence determined in accordance with a predetermined rule (formula), based on a physical layer cell identity (also referred to as a PCI, a Cell ID, or the like) for identifying the base station apparatus 3, a bandwidth to which the uplink reference signal is mapped, a cyclic shift notified with the uplink grant, a parameter value for generation of a DMRS sequence, and the like. In accordance with the control signal input from the controller 103, the multiplexing unit 1075 rearranges modulation symbols of the PUSCH in parallel and then performs Discrete Fourier Transform (DFT) on the rearranged modulation symbols. The multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmitting unit 1077 performs Inverse Fast Fourier Transform (IFFT) on a signal resulting from the multiplexing, generates an SC-FDMA symbol, adds a CP to the generated SC-FDMA symbol, generates a baseband digital signal, converts the baseband digital signal into an analog signal, removes unnecessary frequency components through a low-pass filter, up-converts a result of the removal into a signal of a carrier frequency, performs power amplification, and outputs a final result to the transmit and/or receive antenna 109 for transmission.

FIG. 9 is a schematic block diagram illustrating a configuration of the base station apparatus 3 according to the present embodiment. As illustrated in the figure, the base station apparatus 3 includes a higher layer processing unit 301, a controller 303, a receiver 305, a transmitter 307, and a transmit and/or receive antenna 309. The higher layer processing unit 301 includes a radio resource control unit 3011, a medium access control layer processing unit 3012, a scheduling unit 3013, and an SPS control unit 3015. The receiver 305 includes a decoding unit 3051, a demodulation unit 3053, a demultiplexing unit 3055, a radio receiving unit 3057, and a channel measurement unit 3059. The transmitter 307 includes a coding unit 3071, a modulation unit 3073, a multiplexing unit 3075, a radio transmitting unit 3077, and a downlink reference signal generation unit 3079.

The higher layer processing unit 301 performs processing of a Medium Access Control (MAC) layer, a Packet Data Convergence Protocol (PDCP) layer, a Radio Link Control (RLC) layer, and a Radio Resource Control (RRC) layer. The higher layer processing unit 301 generates control information for control of the receiver 305 and the transmitter 307, and outputs the generated control information to the controller 303.

The radio resource control unit 3011 included in the higher layer processing unit 301 generates, or obtains from a higher node, the downlink data (the transport block) mapped to the downlink PDSCH, system information, the RRC message, the MAC Control Element (CE), and the like, and outputs a result of the generation or the acquirement to the transmitter 307. The radio resource control unit 3011 manages various configuration information/parameters for each of the terminal apparatuses 1. The radio resource control unit 3011 may set various configuration information/parameters for each of the terminal apparatuses 1 through higher layer signaling. In other words, the radio resource control unit 1011 transmits/broadcasts information for indicating various configuration information/parameters. The radio resource control unit 3011 is also referred to as a configuration unit 3011.

The medium access control layer processing unit 3012 included in the higher layer processing unit 301 performs processing of the Medium Access Control (MAC) layer. The medium access control layer processing unit 3012 performs processing of the MAC entity, the HARQ entity, and the first entity.

The scheduling unit 3013 included in the higher layer processing unit 301 determines a frequency and a subframe to which the physical channels (PDSCH and PUSCH) are allocated, the coding rate and modulation scheme for the physical channels (PDSCH and PUSCH), the transmit power, and the like, from the received channel state information and from the channel estimate, channel quality, or the like input from the channel measurement unit 3059. The scheduling unit 3013 generates the control information (e.g., the DCI format) in order to control the receiver 305 and the transmitter 307, based on a result of the scheduling, and outputs the generated information to the controller 303. The scheduling unit 3013 further determines timing of performing transmission processing and reception processing.

The SPS control unit 3015 included in the higher layer processing unit 301 performs controls concerning the SPS, based on various configuration information, and information or conditions regarding the SPS such as parameters.

Based on the control information from the higher layer processing unit 301, the controller 303 generates a control signal for control of the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and/or receive antenna 309, and outputs information resulting from the decoding to the higher layer processing unit 301. The radio receiving unit 3057 converts (down converts) an uplink signal received through the transmit and/or receive antenna 309 into a baseband signal through orthogonal demodulation, removes unnecessary frequency components, controls the amplification level in such a manner as to suitably maintain a signal level, performs orthogonal demodulation, based on an in-phase component and an orthogonal component of the reception signal, and converts the resulting orthogonally-demodulated analog signal into a digital signal. The receiver 305 receives the uplink control information.

The radio receiving unit 3057 removes a portion corresponding to a Cyclic Prefix (CP) from the digital signal resulting from the conversion. The radio receiving unit 3057 performs Fast Fourier Transform (FFT) on the signal from which the CP has been removed, extracts a signal in the frequency domain, and outputs the resulting signal to the demultiplexing unit 3055.

The demultiplexing unit 1055 demultiplexes the signal input from the radio receiving unit 3057 into the PUCCH, the PUSCH, and the signal such as the uplink reference signal. Note that the demultiplexing is performed based on radio resource allocation information that is determined in advance by the base station apparatus 3 by using the radio resource control unit 3011 and that is included in the uplink grant notified to each of the terminal apparatuses 1. The demultiplexing unit 3055 makes a compensation of channels including the PUCCH and the PUSCH from the channel estimate input from the channel measurement unit 3059. The demultiplexing unit 3055 outputs, to the channel measurement unit 3059, an uplink reference signal resulting from the demultiplexing.

The demodulation unit 3053 performs Inverse Discrete Fourier Transform (IDFT) on the PUSCH, obtains modulation symbols, and performs reception signal demodulation, that is, demodulates each of the modulation symbols on the PUCCH and the PUSCH, in compliance with the modulation scheme determined in advance, such as Binary Phase Shift Keying (BPSK), QPSK, 16 QAM, or 64 QAM, or in compliance with the modulation scheme that the base station apparatus 3 itself notified in advance with the uplink grant to each of the terminal apparatuses 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal apparatuses 1 and information indicating the precoding to be performed on the sequences.

The decoding unit 3051 decodes the coded bits of the PUCCH and the PUSCH, which have been demodulated, at the coding rate in compliance with a coding scheme determined in advance, the coding rate being determined in advance or being notified in advance with the uplink grant to the terminal apparatus 1 by the base station apparatus 3 itself, and outputs the decoded uplink data and uplink control information to the higher layer processing unit 101. In a case that the PUSCH is retransmitted, the decoding unit 3051 performs the decoding with the coded bits input from the higher layer processing unit 301 and retained in a HARQ buffer, and the demodulated coded bits. The channel measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmitter 307 generates the downlink reference signal in accordance with the control signal input from the controller 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal apparatus 1 through the transmit and/or receive antenna 309.

The coding unit 3071 codes the HARQ indicator, the downlink control information, and the downlink data that are input from the higher layer processing unit 301, in compliance with a predetermined coding scheme such as block coding, convolutional coding, and turbo coding, or in compliance with the coding scheme determined by the radio resource control unit 3011. The modulation unit 3073 modulates the coded bits input from the coding unit 3071, in compliance with a predetermined modulation scheme such as BPSK, QPSK, 16 QAM, and 64 QAM, or in compliance with the modulation scheme determined by the radio resource control unit 3011.

The downlink reference signal generation unit 3079 generates, as the downlink reference signal, a sequence that is already known to the terminal apparatus 1 and that is determined in accordance with a predetermined rule, based on the physical layer cell identity (PCI) for identifying the base station apparatus 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmitting unit 3077 performs Inverse Fast Fourier Transform (IFFT) on the modulation symbol resulting from the multiplexing or the like, generates an OFDM symbol, adds a CP to the generated OFDM symbol, generates a baseband digital signal, converts the baseband digital signal into an analog signal, removes unnecessary frequency components through a low-pass filter, up-converts a result of the removal into a signal of a carrier frequency, performs power amplification, and outputs a final result to the transmit and/or receive antenna 309 for transmission.

Various aspects of the terminal apparatus 1 and the base station apparatus 3 according to the present embodiment will be described below.

(1) A first aspect of the present embodiment is a terminal apparatus 1. The terminal apparatus 1 includes a receiver, and a medium access control layer processing unit. The receiver is configured to receive a higher layer parameter skipUplinkTxSPS. The medium access control layer processing unit is configured to determine whether to generate a MAC protocol data unit, based on at least whether the higher layer parameter skipUplinkTxSPS is configured. The medium access control layer processing unit determines whether to perform non-adaptive retransmission, based on at least whether the higher layer parameter is configured. Here, in a case that uplink HARQ operation is asynchronous, the medium access control layer processing unit may determine whether to perform non-adaptive retransmission, based on at least whether the higher layer parameter skipUplinkTxSPS is configured.

(2) In the first aspect of the present embodiment, in a case that uplink HARQ operation is synchronous, the medium access control layer processing unit determines whether to perform non-adaptive retransmission of a semi-persistently scheduled transport block, irrespective of whether the higher layer parameter skipUplinkTxSPS is configured.

(3) In the first aspect of the present embodiment, in a case that the higher layer parameter skipUplinkTxSPS is configured, an uplink grant is a configured grant, and the MAC protocol data unit does not include a MAC service data unit and includes only a MAC CE for a Padding BSR or a Periodic BSR, the medium access control layer processing unit does not generate the MAC protocol data unit. In the first embodiment, in a case that the higher layer parameter skipUplinkTxSPS is configured, an uplink grant is a configured grant, and the MAC protocol data unit does not include a MAC service data unit and a MAC CE other than a MAC CE for a Padding BSR or a Periodic BSR, the medium access control layer processing unit does not generate the MAC protocol data unit.

(4) A second aspect of the present embodiment is a base station apparatus 3. The base station apparatus 3 includes a transmitter, a receiver, and a medium access control layer processing unit. The transmitter is configured to transmit a higher layer parameter skipUplinkTxSPS used by a terminal apparatus to determine whether to generate a MAC protocol data unit. The receiver is configured to receive non-adaptive retransmission. The medium access control layer processing unit is configured to determine whether non-adaptive retransmission is to be performed by the terminal apparatus, based on at least whether the higher layer parameter skipUplinkTxSPS is configured for the terminal apparatus. Here, in a case that uplink HARQ operation is asynchronous, the medium access control layer processing unit may determine whether non-adaptive retransmission is to be performed by the terminal apparatus, based on at least whether the higher layer parameter skipUplinkTxSPS is configured for the terminal apparatus.

(5) In the second aspect of the present embodiment, in a case that uplink HARQ operation is synchronous, the medium access control layer processing unit determines whether non-adaptive retransmission of a semi-persistently scheduled transport block is to be performed by the terminal apparatus, irrespective of whether the higher layer parameter skipUplinkTxSPS is configured for the terminal apparatus.

(6) In the second aspect of the present embodiment, in a case that the higher layer parameter skipUplinkTxSPS is configured for the terminal apparatus, an uplink grant is a configured grant, and the MAC protocol data unit does not include a MAC service data unit and includes a MAC CE for a Padding BSR or a Periodic BSR, the MAC protocol data unit is not generated by the terminal apparatus.

(7) A third aspect of the present embodiment is a terminal apparatus 1. The terminal apparatus 1 includes a receiver and a medium access control layer processing unit. The receiver is configured to receive higher layer information for indicating configuration or release of a higher layer parameter skipUplinkTxSPS, and an uplink grant. The medium access control layer processing unit is configured to store the uplink grant as a configured grant, and determine whether uplink HARQ operation is synchronous or asynchronous, based on at least whether the higher layer parameter skipUplinkTxSPS is configured. In a case that the higher layer parameter is previously configured and the higher layer information for indicating release of the higher layer parameter skipUplinkTxSPS is received, the medium access control layer processing unit clears the configured grant.

(8) In the third aspect of the present embodiment, in a case that the higher layer parameter skipUplinkTxSPS is not previously configured and the higher layer information for indicating configuration of the higher layer parameter skipUplinkTxSPS is received, the medium access control layer processing unit clears the configured grant.

(9) In the third aspect of the present embodiment, in a case that the higher layer parameter skipUplinkTxSPS is previously released and the higher layer information for indicating configuration of the higher layer parameter skipUplinkTxSPS is received, the medium access control layer processing unit clears the configured grant.

(10) A fourth aspect of the present embodiment is a base station apparatus 3. The base station apparatus 3 includes a transmitter and a medium access control layer processing unit. The transmitter is configured to transmit higher layer information for indicating configuration or release of a higher layer parameter skipUplinkTxSPS, and an uplink grant to be stored in a terminal apparatus as a configured grant. The medium access control layer processing unit is configured to determine whether uplink HARQ operation is synchronous or asynchronous, based on at least whether the higher layer parameter skipUplinkTxSPS is configured for the terminal apparatus. In a case that the higher layer parameter skipUplinkTxSPS is previously configured for the terminal apparatus and the higher layer information for indicating release of the higher layer parameter skipUplinkTxSPS is transmitted to the terminal apparatus, the medium access control layer processing unit considers that the configured grant is cleared by the terminal apparatus.

(11) In the third aspect of the present embodiment, in a case that the higher layer parameter skipUplinkTxSPS is not previously configured for the terminal apparatus and the higher layer information for indicating configuration of the higher layer parameter skipUplinkTxSPS is transmitted to the terminal apparatus, the medium access control layer processing unit considers that the configured grant is cleared by the terminal apparatus.

(12) In the third aspect of the present embodiment, in a case that the higher layer parameter skipUplinkTxSPS is previously released in the terminal apparatus and the higher layer information for indicating configuration of the higher layer parameter skipUplinkTxSPS is transmitted to the terminal apparatus, the medium access control layer processing unit considers that the configured grant is cleared by the terminal apparatus.

(13) A fourth aspect of the present embodiment is a terminal apparatus 1. The terminal apparatus 1 includes a receiver and a transmitter. The receiver is configured to receive, from a base station apparatus 3, information UECapabilityEnquiry used to request transmission of capability information UECapabilityInformation of the terminal apparatus 1. The transmitter is configured to transmit the capability information UECapabilityInformation to the base station apparatus 3. The capability information UECapabilityInformation includes at least a capability parameter SPS, a capability parameter skipUplinkSPS, and a capability parameter skipUplinkLaaSPS. The capability parameter SPS indicates whether the terminal apparatus 1 supports Semi-Persistent Scheduling in a primary cell. The capability parameter skipUplinkSPS indicates whether the terminal apparatus 1 supports skipping of uplink transmission corresponding to a grant configured for the primary cell in a case that there is no available data for transmission in a buffer of the terminal apparatus 1. The capability parameter skipUplinkLaaSPS indicates (i) whether the terminal apparatus 1 supports the Semi-Persistent Scheduling in an LAA secondary cell, and (ii) whether the terminal apparatus 1 supports skipping of uplink transmission corresponding to the grant configured for the LAA secondary cell in a case that there is no available data for transmission in a buffer of the terminal apparatus 1.

(14) A fifth aspect of the present embodiment is a base station apparatus 3. The base station apparatus 3 includes a transmitter and a receiver. The transmitter is configured to transmit, to a terminal apparatus 1, information UECapabilityEnquiry used to request transmission of capability information UECapabilityInformation of the terminal apparatus 1. The receiver is configured to receive the capability information UECapabilityInformation from the terminal apparatus 1. The capability information UECapabilityInformation includes at least a capability parameter SPS, a capability parameter skipUplinkSPS, and a capability parameter skipUplinkLaaSPS. The capability parameter SPS indicates whether the terminal apparatus supports Semi-Persistent Scheduling in a primary cell. The capability parameter skipUplinkSPS indicates whether the terminal apparatus 1 supports skipping of uplink transmission corresponding to a grant configured for the primary cell in a case that there is no available data for transmission in a buffer of the terminal apparatus 1. The capability parameter skipUplinkLaaSPS indicates (i) whether the terminal apparatus 1 supports the Semi-Persistent Scheduling in an LAA secondary cell, and (ii) whether the terminal apparatus 1 supports skipping of uplink transmission corresponding to the grant configured for the LAA secondary cell in a case that there is no available data for transmission in a buffer of the terminal apparatus 1.

(15) In the fourth and fifth aspects of the present embodiment, the capability parameter skipUplinkLaaSPS does not indicate that the terminal apparatus 1 supports one of (i) Semi-Persistent Scheduling in the LAA secondary cell, and (ii) supporting skipping of uplink transmission corresponding to a grant configured for the LAA secondary cell in a case that there is no available data for transmission in the buffer of the terminal apparatus 1.

(16) In the fourth and fifth aspects of the present embodiment, the capability information UECapabilityInformation further includes a capability parameter skipUplinkDynamic. The capability parameter skipUplinkDynamic indicates whether skipping of uplink transmission corresponding to an uplink grant for the primary cell and uplink transmission corresponding to an uplink grant for the LAA secondary cell is supported in a case that there is no available data for transmission in the buffer of the terminal apparatus 1. Here, the uplink grant for the primary cell and the uplink grant for the LAA secondary cell correspond to a C-RNTI.

(17) A sixth aspect of the present embodiment is a terminal apparatus 1 for communicating with a base station apparatus 3 by using a primary cell and an LAA secondary cell. The terminal apparatus 1 includes a receiver and a transmitter. The receiver is configured to receive information for indicating a parameter skipUplinkTxSPS corresponding to the primary cell, information for indicating a parameter skipUplinkTxLaaSPS corresponding to the LAA secondary cell, and information for indicating a parameter skipUplinkTxDynamic corresponding to the primary cell and the LAA secondary cell. The transmitter is configured to perform uplink transmission. The transmitter further skips first uplink transmission corresponding to a first uplink grant configured for the primary cell, based on at least a state that the parameter skipUplinkTxSPS is configured. The transmitter further skips second uplink transmission corresponding to a second uplink grant configured for the LAA secondary cell, based on at least a state that the parameter skipUplinkTxLaaSPS is configured. The transmitter further skips third uplink transmission in the primary cell and fourth uplink transmission in the LAA secondary cell, based on at least a state that the parameter skipUplinkTxDynamic is configured. The third uplink transmission corresponds to a third uplink grant corresponding to a C-RNTI. The fourth uplink transmission corresponds to a fourth uplink grant corresponding to the C-RNTI.

(18) In the sixth aspect of the present embodiment, the terminal apparatus 1 further communicates with the base station apparatus 3 by using a second LAA secondary cell. The receiver further receives information for indicating a second parameter skipUplinkTxLaaSPS corresponding to the second LAA secondary cell. The transmitter further skips fifth uplink transmission corresponding to a fifth uplink grant configured for the second LAA secondary cell, based on at least a state that the second parameter skipUplinkTxLaaSPS is configured.

(19) In the sixth aspect of the present embodiment, the configured uplink grant may be a configured grant. In the sixth aspect of the present embodiment, the terminal apparatus 1 may store an uplink grant included in a PDCCH or an RRC message (parameter semiPersistSchedResourceUL) as the configured uplink grant.

(20) In the fourth to sixth aspects of the present embodiment, the uplink transmission may be PUSCH transmission. In the fourth to sixth aspects of the present embodiment, the uplink transmission may be PUSCH initial transmission.

This allows the uplink data to be efficiently transmitted.

A program running on the base station apparatus 3 and the terminal apparatus 1 according to one aspect of the present invention may be a program (program that causes a computer to function) that controls a Central Processing Unit (CPU) and the like, such that the program realizes the functions of the above-described embodiment according to one aspect of the present invention. The information handled in these apparatuses is temporarily stored in a Random Access Memory (RAM) while being processed. Thereafter, the information is stored in various types of Read Only Memory (ROM) such as a Flash ROM and a Hard Disk Drive (HDD), and as necessary, is read by the CPU to be modified or rewritten.

Note that the terminal apparatus 1 and the base station apparatus 3 according to the above-described embodiment may be partially achieved by a computer. In such a case, a program for realizing such control functions may be recorded on a computer-readable recording medium to cause a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. The "computer-readable recording medium" refers to a portable medium such as a flexible disk, a magneto-optical disk, a ROM, and a CD-ROM, and a storage apparatus such as a hard disk built into the computer system.

The "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. The program may be configured to realize some of the functions described above, and also may be configured to be capable of realizing the functions described above in combination with a program already recorded in the computer system.

The base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group may include each general function or each general functional block of the base station apparatus 3. The terminal apparatus 1 according to the above-described embodiment can also communicate with the base station apparatus as the aggregation.

The base station apparatus 3 according to the above-described embodiment may serve as an Evolved Universal Terrestrial Radio Access Network (EUTRAN). The base station apparatus 3 according to the above-described embodiment may have some or all portions of the functions of a node higher than an eNodeB.

Some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. A circuit integration technique is not limited to the LSI, and may be realized with a dedicated circuit or a general-purpose processor. In a case that with advances in semiconductor technology, a circuit integration technology with which an LSI is replaced appears, it is also possible to use an integrated circuit based on the technology.

According to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of one aspect of the present invention defined by claims, and embodiments that are made by suitably combining technical means disclosed according to the different embodiments are also included in the technical scope of the present invention. A configuration in which constituent elements, described in the respective embodiments and having mutually the same effects, are substituted for one another is also included in the technical scope of the present invention.

INDUSTRIAL APPLICABILITY

One aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
101 Higher layer processing unit
103 Controller
105 Receiver
107 Transmitter
301 Higher layer processing unit
303 Controller
305 Receiver
307 Transmitter
1011 Radio resource control unit
1012 Medium access control layer processing unit
1013 Scheduling information interpretation unit
1015 SPS control unit
3011 Radio resource control unit
3012 Medium access control layer processing unit
3013 Scheduling unit
3015 SPS control unit

The invention claimed is:

1. A terminal apparatus for communicating with a base station apparatus by using a primary cell and an LAA (Licensed Assisted Access) secondary cell, the terminal apparatus comprising:
   reception circuitry configured to receive information indicating a parameter skipUplinkTxDynamic; and
   transmission circuitry configured to perform an uplink transmission, wherein
   the transmission circuitry is further configured to:
      skip a first uplink transmission at least based on a first configured uplink grant for the LAA secondary cell, the first configured uplink grant corresponding to the first uplink transmission,
      skip a second uplink transmission in the primary cell in a case that the parameter skipUplinkTxDynamic is configured, and
      skip a third uplink transmission in the LAA secondary cell in the case that the parameter skipUplinkTxDynamic is configured,
   the second uplink transmission corresponds to a third uplink grant corresponding to a C-RNTI, and
   the third uplink transmission corresponds to a fourth uplink grant corresponding to the C-RNTI.

2. A communication method used in a terminal apparatus for communicating with a base station apparatus by using a primary cell and an LAA (Licensed Assisted Access) secondary cell, the communication method comprising:
   receiving information for indicating a parameter skipUplinkTxDynamic;
   performing an uplink transmission;
   skipping a first uplink transmission at least based on a first configured uplink grant for the LAA secondary cell, the first configured uplink grant corresponding to the first uplink transmission;
   skipping a second uplink transmission in the primary cell in a case that the parameter skipUplinkTxDynamic is configured; and
   skipping a third uplink transmission in the LAA secondary cell in a case that the parameter skipUplinkTxDynamic is configured, wherein
   the second uplink transmission corresponds to a third uplink grant corresponding to a C-RNTI, and
   the third uplink transmission corresponds to a fourth uplink grant corresponding to the C-RNTI.

* * * * *